US010422625B1

(12) United States Patent
Gerwe et al.

(10) Patent No.: US 10,422,625 B1
(45) Date of Patent: Sep. 24, 2019

(54) MODULAR INTERFEROMETRIC TELESCOPE

(71) Applicant: The Boeing Company, Chicago, IL (US)

(72) Inventors: David Roderick Gerwe, West Hills, CA (US); Steven F. Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/031,298

(22) Filed: Jul. 10, 2018

(51) Int. Cl.
*G01B 9/02* (2006.01)
*G01B 9/06* (2006.01)

(52) U.S. Cl.
CPC ............. *G01B 9/06* (2013.01); *G01B 9/0203* (2013.01); *G01B 9/02012* (2013.01); *G01B 9/02084* (2013.01); *G01B 9/02089* (2013.01); *G01B 2290/10* (2013.01)

(58) Field of Classification Search
CPC ............ G01B 9/02015; G01B 9/02027; G01B 9/02028; G01B 9/02049
See application file for complete search history.

(56) References Cited

U.S. PATENT DOCUMENTS

| 7,154,608 | B1 * | 12/2006 | Glassman | G02F 1/39 356/450 |
| 2004/0051878 | A1 * | 3/2004 | Rhoads | G02B 17/0663 356/521 |
| 2010/0053635 | A1 * | 3/2010 | Lyon | G01B 11/272 356/510 |

OTHER PUBLICATIONS

Leisawitz, "The Space Infrared Interferometric Telescope (SPIRIT)," Goddard Space Flight Center, 1st FISICA Workshop, dated Feb. 18, 2014, accessed Jul. 9, 2017, pp. 28-29.

* cited by examiner

*Primary Examiner* — Jonathan M Hansen
(74) *Attorney, Agent, or Firm* — Yee & Associates, P.C.

(57) ABSTRACT

A modular interferometric telescope including a base and an optical detector. A mounting beam has a first end, a second end, and a length, and is connected rotatably to the base at a point between the first and second end. The mounting beam is rotatable about a first axis extending in a direction of an object to be observed. A first light-collecting assembly is connected to the mounting beam proximal to the first end relative to the second end. The first light-collecting assembly directs light from the object to the optical detector. A second light-collecting assembly connected to the mounting beam is proximal to the second end relative to the first end. The second light-collecting assembly directs the light from the object to the optical detector. A first optical assembly is configured to receive the light from the object and direct the light to the optical detector.

20 Claims, 18 Drawing Sheets

APPROXIMATE DIMENSIONS
FOR OBJECT AT 36000km

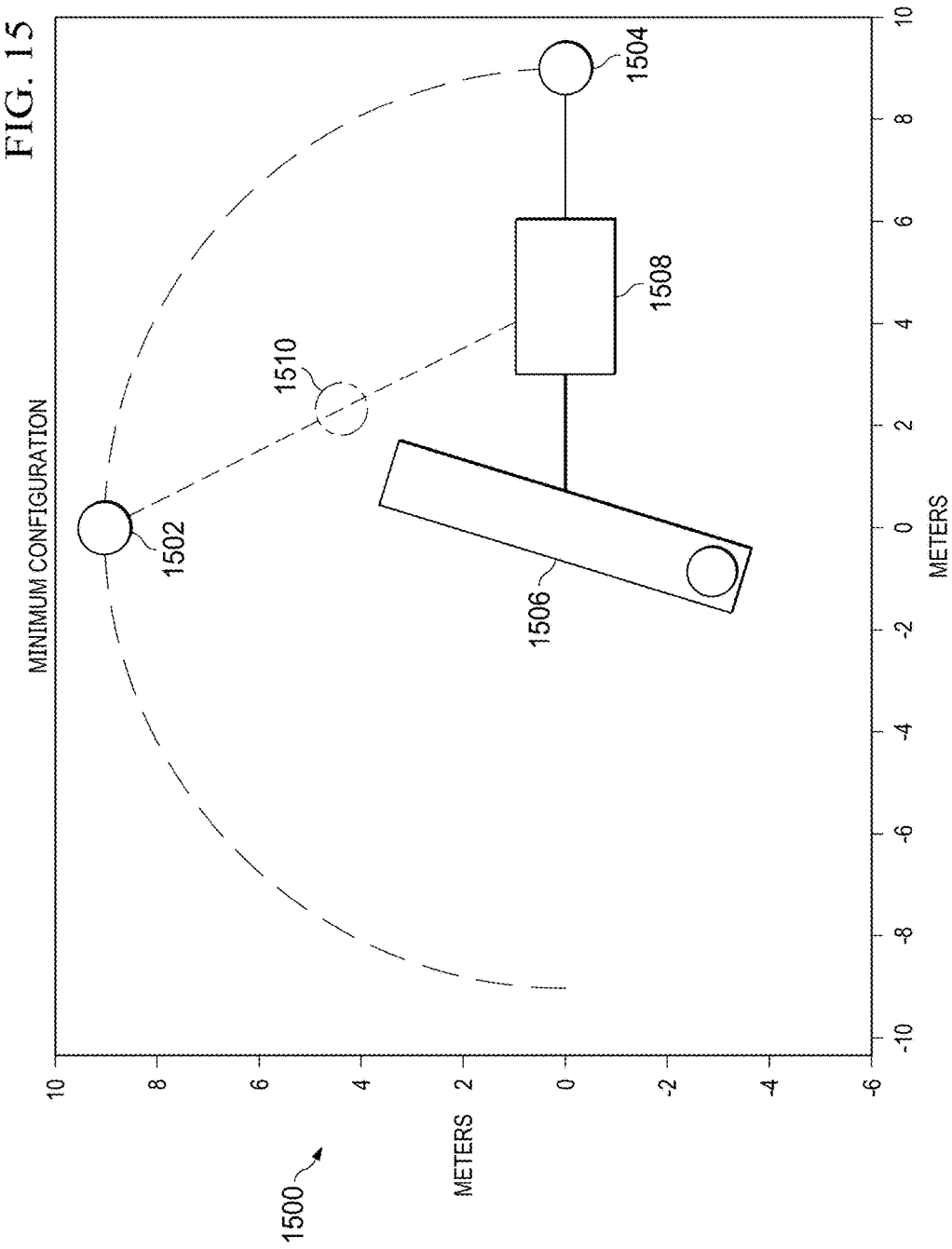

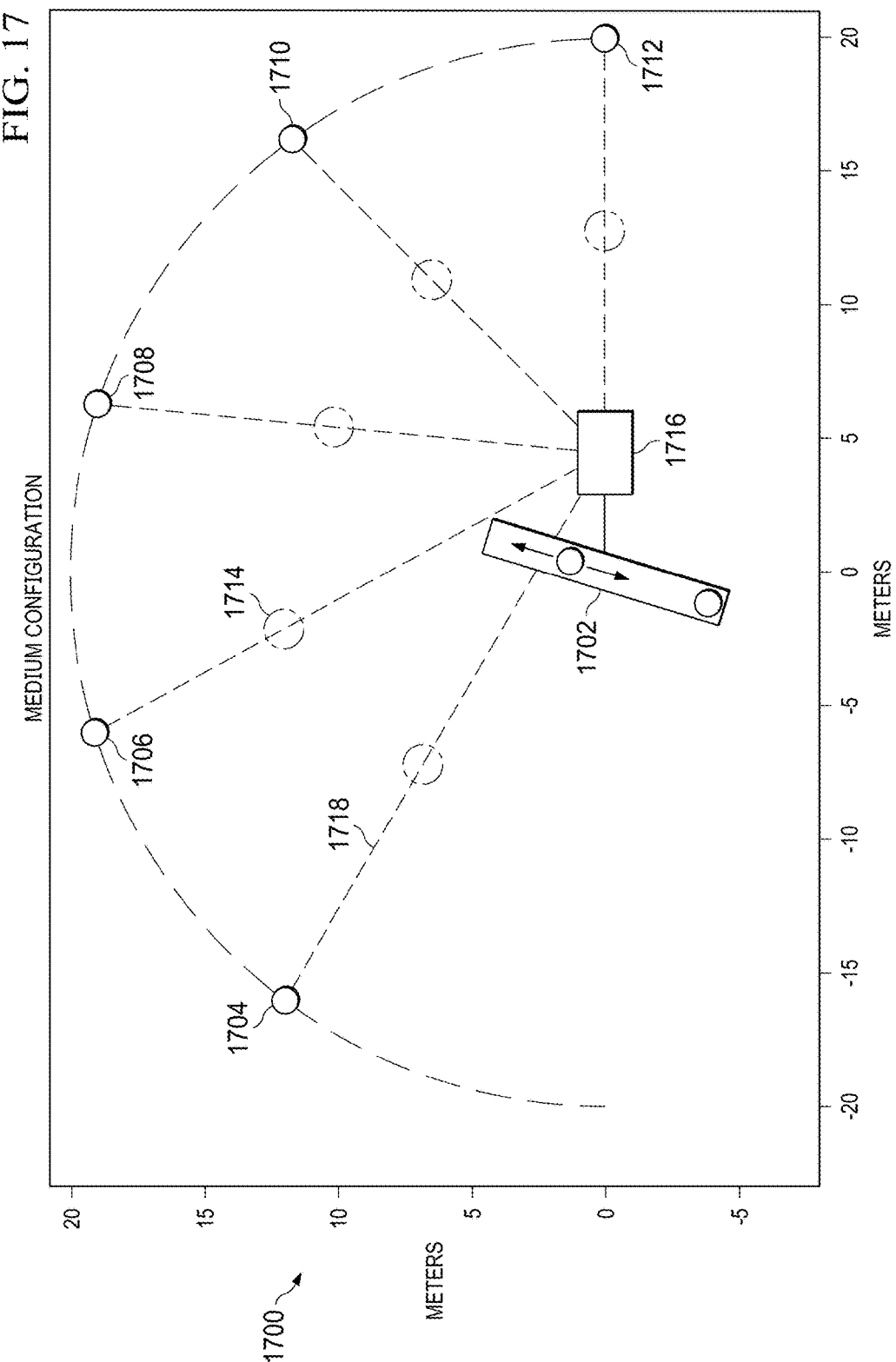

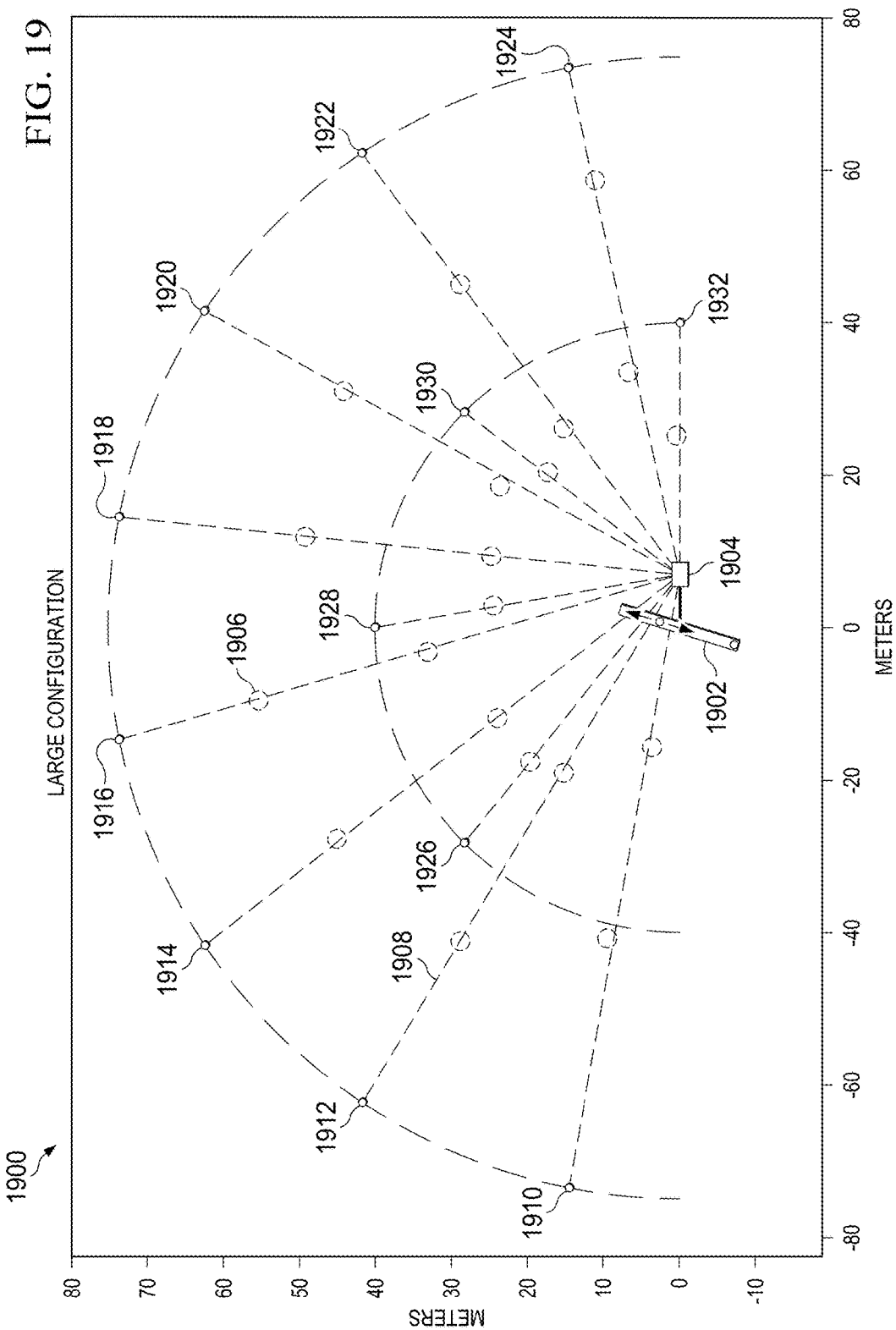

MODULAR INTERFEROMETRIC TELESCOPE

BACKGROUND INFORMATION

1. Field

The present disclosure relates to a modular interferometric telescope and methods for using the same.

2. Background

There are many types of telescopes. A telescope familiar to most people is known as a refracting telescope, which is composed of one or more lenses that focus light so that objects observed through the eyepiece will appear to be larger relative to observing the same object with the naked eye. Another type of telescope is known as the reflecting telescope, which accomplishes the same function using mirrors.

SUMMARY

The illustrative embodiments provide for a modular interferometric telescope. The modular interferometric telescope includes a base and an optical detector connected to the base. The modular interferometric telescope also includes a mounting beam having a first end, a second end, and a length, and connected rotatably to the base at a point between the first end and the second end. The mounting beam is rotatable about a first axis that extends in a direction of an object to be observed by the modular interferometric telescope. The modular interferometric telescope also includes a first light-collecting assembly connected to the mounting beam proximal to the first end relative to the second end. The first light-collecting assembly directs light from the object to the optical detector. The modular interferometric telescope also includes a second light-collecting assembly connected to the mounting beam proximal to the second end relative to the first end. The second light-collecting assembly directs the light from the object to the optical detector. The modular interferometric telescope also includes a first optical assembly configured to receive the light from the object and direct the light to the optical detector. The first optical assembly is located a first distance away from the optical detector and from the mounting beam. The first distance is greater than the length.

The illustrative embodiments also provide for a method of observing an object using a modular interferometric telescope that includes a base; an optical detector connected to the base; a mounting beam having a first end, a second end, and a length, and connected rotatably to the base at a point between the first end and the second end, wherein the mounting beam is rotatable about a first axis that extends in a direction of an object to be observed by the modular interferometric telescope; a first light-collecting assembly connected to the mounting beam proximal to the first end relative to the second end, wherein the first light-collecting assembly directs light from the object to the optical detector; a second light-collecting assembly connected to the mounting beam proximal to the second end relative to the first end, wherein the second light-collecting assembly directs the light from the object to the optical detector; and a first optical assembly configured to receive the light from the object and direct the light to the optical detector, wherein the first optical assembly is located a first distance away from the optical detector and from the mounting beam, and wherein the first distance is greater than the length. The method includes receiving the light at the first light-collecting assembly, the second light-collecting assembly, and the first optical assembly. The method also includes transmitting the light from the first light-collecting assembly, the second light-collecting assembly, and the first optical assembly to the optical detector. The method also includes moving at least one of the first light-collecting assembly, the second light-collecting assembly, and the first optical assembly while receiving the light. The method also includes measuring an interference pattern caused by moving. The method also includes computing, using a computer, an image of the object from the interference pattern and the light. The method also includes storing or displaying the image.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is an illustration of an alternative minimum configuration of a modular interferometric telescope, in accordance with an illustrative embodiment;

FIG. 17 illustrates a medium configuration of a modular interferometric telescope, in accordance with an illustrative embodiment;

FIG. 19 illustrates a large configuration of a modular interferometric telescope, in accordance with an illustrative embodiment;

DETAILED DESCRIPTION

Figure 1:
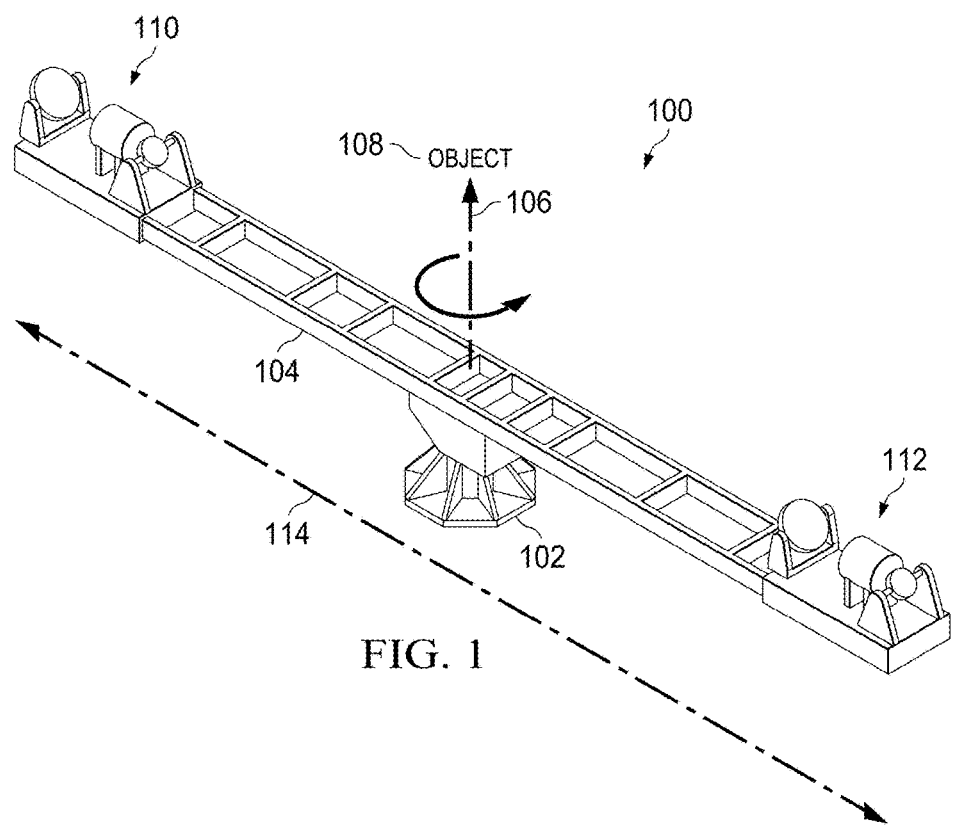
FIG. 1 illustrates an interferometric telescope, in accordance with an illustrative embodiment.

The illustrative embodiments provide for a plurality of interferometric telescopes in visual communication with one another for providing an image of objects located at extreme distances from earth. Each of the interferometric telescopes capture a specific wavelength range for filling a portion of the image. These various portions are collected by a central assembly for combining the portions and creating the combined image.

The illustrative embodiments recognize and take into account that currently available technology used to view objects at extreme distances, such as object in geostationary orbit or further, require that "giant telescopes" be constructed. As used herein, the term "giant telescope" refers to refractor or reflector telescopes wherein the main support beam would need to be about 30 meters in length and would need to employ extremely large mirrors on the order of this size.

The illustrative embodiments also recognize and take into account that, while a giant telescope may work, in reality there are several factors that would prevent such a device from being feasible in many situations, particularly if the telescope will be located on Earth and be subject to gravitational forces. Notwithstanding the financial costs associated with construction of such giant telescopes, the physical structure and the required precision thereof tends to make construction of such impractical. For example, the required beam of 30 or more meters will tend to sag due to gravitational forces. This fact means the beam requires counter weights and supports not generally needed with smaller designs. Thus, while construction of a giant telescope is not impossible, the costs and the physical limitations make it more difficult and harder to justify. For this reason, and further given the ever increasing demand for time using precision telescopes, alternatives to giant telescopes with comparable precision are sought.

The illustrative embodiments address these and other issues. The modular interferometric telescope of the illustrative embodiments provides highly accurate images of distant objects, and is able to do so with a relatively smaller overall envelope at a significantly lower cost when compared to alternatives. The modular interferometric telescope includes a plurality of interferometric telescopes oriented relative to one another for allowing visual communication therebetween. The interferometric telescopes are further defined as a central assembly and at least one peripheral assembly. Most commonly, there will be at least three peripheral optical assemblies disposed about the central assembly, though as little as one peripheral optical assembly could be used and possibly many more than three peripheral optical assemblies can be used.

In one embodiment, the central assembly rotates and the peripheral assemblies remain fixed. In other embodiments, each of the assemblies rotate at individual rotational speeds. In other words, the central assembly rotates at a first rotational speed, one of the peripheral assemblies rotates at a second rotational speed, another peripheral assembly rotates at a third rotational speed, etc. The latter embodiment is desirable because the telescope device is not reliant upon the rotation of the Earth, and tends to provide a more accurate and clearer image of the object. Additionally, it should be noted that the rotational speeds of the various assemblies are very low, and may or may not be dependent upon one another.

The illustrative embodiments recognize that current interferometric imaging systems designed for astronomy (such as CHARA, Keck, VLT, COAST, etc.) rely on Earth's rotation to rotate the instrument relative to the distant object and fill in measurements azimuthally about the u-v plane. Therefore, this approach relying on Earth's rotation may require twelve hours to obtain a complete set of measurements. Furthermore, this approach relying on Earth's rotation does not work for imaging of objects orbiting the Earth because their relative rotations typically span a small angular range, especially for geo-synchronous orbits. The illustrative embodiments address these issues by providing, relative to the Earth's rotation, rapid rotation of the assemblies described herein.

In one embodiment, the system collects measurements as the assemblies are continuously rotated. In another embodiment, the system is rotated incrementally to a discrete series of angles and measurements are collected at each of these discrete angles, while the system is temporarily fixed at an angle.

Thus, the illustrative embodiments may be characterized as a telescopic device for viewing objects, the device comprising: a central assembly configured to rotate at a predetermined speed; a first peripheral assembly in visual communication with the central assembly, the first peripheral assembly configured to rotate at a first speed independent of the predetermined speed for collecting images of an object within a first wavelength range; and a second peripheral assembly in visual communication with the central assembly, the second peripheral assembly configured to rotate at a second speed independent of the predetermined and first speeds for collecting images of an object within a second wavelength range; wherein the object images collected within the first wavelength range are combined with the object images collected within the second wavelength range via the central assembly for creating a composite image of the object. For this telescopic device, the first and second speeds may be zero, such that the first and second peripheral assemblies are fixed relative to the central assembly. Alternatively, the telescopic device may include a third peripheral assembly in visual communication with the central assembly, the third peripheral assembly configured to rotate at a third speed independent of the predetermined, first, and second speeds for collecting images of an object within a third wavelength range, wherein the images collected within the third wavelength range are combined with the images collected at the first and second wavelength ranges via the central assembly for creating a more detailed composite image of the object.

In an illustrative embodiment, the light from each collecting assembly is transported to the central assembly where it is interfered. Interference of light between the combined beams may be done wavelength-by-wavelength. There may be multiple wavelength ranges at which this technique is done, such as 400-900 nanometers and 1100-1500 nanometers. However, this technique will not be done at one range for collector A and a different range for collector B. Rather, light from collectors $\{1, 2, 3, \ldots N\}$ will be interfered together over one or more common ranges. Potentially a different subset of the collectors could be interfered together over a different set of wavelength ranges.

Figure 8:
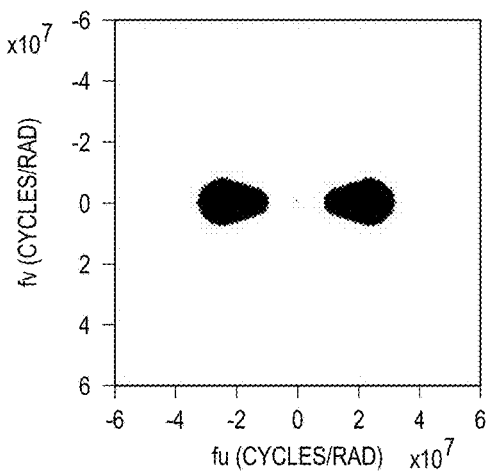
FIG. 8 illustrates a representation of a fill-in u-v plane for optical assembly B rotation of the modular interferometric telescope shown in FIG. 5 relative to a single telescope on optical assembly D on the interferometric telescope shown in FIG. 5, over a wavelength range from 500 nm to 900 nm, in accordance with an illustrative embodiment.
Figure 9:
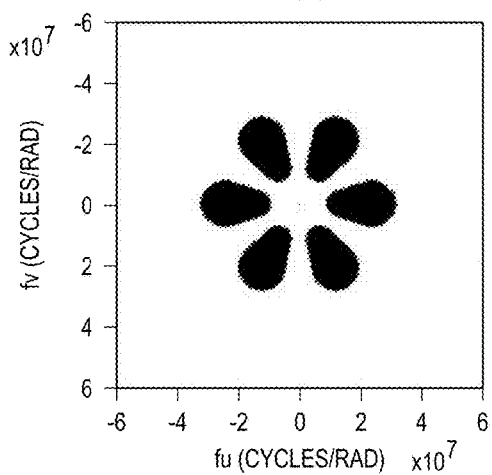
FIG. 9 illustrates a representation of a fill-in u-v plane for optical assembly A, optical assembly B, and optical assembly C rotation of the modular interferometric telescope shown in FIG. 5 relative to a single light-collecting assembly on optical assembly D on the modular interferometric telescope shown in FIG. 5, over a wavelength range from 500 nm to 900 nm, in accordance with an illustrative embodiment.

Attention is now turned to operation of interferometric telescopes, generally. An interferometric telescope, or astronomical interferometer, is an array of separate telescopes, mirror segments, or radio telescope antennas that work together as a single telescope to provide higher resolution images of astronomical objects such as satellites, planets, stars, nebulas and galaxies by means of interferometry. The advantage of this technique is that it can theoretically produce images with the angular resolution of a huge telescope with an aperture equal to the maximum separation between the component telescopes. The main drawback to interferometric telescopes is that they do not collect as much light as the conventional instrument's mirror. Thus, these instruments are mainly useful for fine resolution of more luminous astronomical objects. Another drawback of interferometric telescopes is that, unlike a conventional telescope, which measures the object's Fourier information over a fully filled foot-print in the u-v plane (typically a full circle), the u-v data collected by interferometric systems will often exhibit gaps. Examples of these gaps are shown in FIG. 8 and FIG. 9.

An interferometer is a scientific instrument used to generate and measure interference patterns in light. Useful information can be obtained from measuring these interference patterns. The science of designing and using interferometers is known as interferometry. Interferometry has wide applications including astronomy, biology, physics, engineering, medicine, and other sciences.

One way of processing interferometric data is to perform a mathematical procedure known as a Fourier transform. A Fourier transform decomposes a function of time (a signal) into the frequencies that make it up, in a way similar to how a musical chord can be expressed as the frequencies (or pitches) of its constituent notes. The Fourier transform of a function of time is itself a complex-valued function of frequency, whose absolute value represents the amount of that frequency present in the original function, and whose complex argument is the phase offset of the basic sinusoid in that frequency. The Fourier transform is called the frequency domain representation of the original signal. The term Fourier transform refers to both the frequency domain representation and the mathematical operation that associates the frequency domain representation to a function of time. The Fourier transform can be expressed in several different ways.

In the field of optics and interferometry, for a two-dimensional object, the equivalent description of the object in the Fourier space is based on the object's amplitude spectrum:

$$F(u, v) = \frac{1}{(2\pi^2)} \int \int f(x, y) e^{i2\pi ux + i2\pi vy} dx dy,$$

where the Fourier coordinates (u,v) have units of inverse length and are called spatial frequencies. The Fourier coordinates are sometimes referred to as the u-v plane. Several of the figures herein, such as FIG. 7 through FIG. 10, FIG. 12, FIG. 16A, FIG. 18A, and FIG. 20A refer to "u-v" coverage or "fill-in u-v plane", which refers to a schematic representation of the results of solving this equation using interferometric data taken of the images shown herein. Thus, as used herein, reference to the term "u-v" or "u-v plane" does not refer to "ultraviolet" light, but rather refers to a mathematical function and in particular to an aspect of the Fourier transform of the data taken by the interferometric telescopes described herein.

Attention is now returned to an interferometric telescope itself. Normally, long baseline interferometers only get part of the information needed to form an image. One way of densifying u-v plane coverage is to spin a truss with two collectors and vary the distance between collectors, such as in the National Aeronautics and Space Administration's (NASA) Space Interferometric Telescope (SPIRIT).

However, SPIRIT does not have the resolution desired. To obtain the desired resolution, a very long truss is required.

The illustrative embodiments address this specific problem. In particular, the illustrative embodiments provide for a method of positioning interfering pairs of telescopes that do not require a very long truss but does provide both the densifying of the u-v plane and the very long baseline. The approach of the illustrative embodiments uses multiple pairs of telescopes on relatively small trusses, when compared to the equivalent truss needed to obtain the same resolution.

From an optical or structural perspective, this approach provides many advantages. For example, small trusses can be centrally supported and do not require additional supports along the length of the truss. In another example, a minimum of supports decreases the number of disturbance paths into the optical structure. In still another example, the first vibration mode of a relatively small truss occurs at between 10 and 20 Hz and can easily be damped, greatly decreasing dynamic excitation due to seismic disturbances (from 2 to 20 Hz) and wind (<10 Hz). In contrast, long trusses are likely to have multiple vibration modes that will likely be excited by seismic disturbances and wind, and will be much harder to damp. Thus, the illustrative embodiments provide for a significant advance in the art of interferometric telescopes.

FIG. 1 illustrates an interferometric telescope, in accordance with an illustrative embodiment. Interferometric telescope 100 includes base 102 upon which rests mounting beam 104. Mounting beam 104 may also be a truss in some illustrative embodiments, but may also be solid, a telescoping arm, or may take several different forms. Mounting beam 104 is pivotally attached to base 102 along axis 106 which is directed at object 108. Note that object 108 is likely extremely distant and not shown in detail in FIG. 1.

Mounted on mounting beam 104 are light-collecting assembly 110 and light-collecting assembly 112. Light-collecting assembly 110 and light-collecting assembly 112 collect light from object 108 and direct that light to an optical detector (not shown) located in base 102. From there, the light data is processed by a processor, which may or may not be physically connected or in base 102. An image of object 108 is then reconstructed from the light data for display on a display device.

Light-collecting assembly 110 and light-collecting assembly 112 may be a mirror and other optics designed to receive light from object 108 and direct it towards base 102. While one mirror is shown per assembly, a mirror array is also possible.

In some illustrative embodiments, one or both of light-collecting assembly 110 and light-collecting assembly 112 may be translatable along the length of mounting beam 104, as shown by axis 114. Such translation may be accomplished by changing the length of mounting beam 104, or by mounting the light-collecting assemblies on a translation assembly (such as a rail) and then using a motor to move the light-collecting assemblies along the length of mounting beam 104. In some illustrative embodiments, such movement could also be out-of-plane, meaning up and down relative to the figure shown, or pivoting from side to side relative to the figure shown. Thus, the illustrative embodiments are not necessarily limited to the example shown in FIG. 1.

Figure 2:
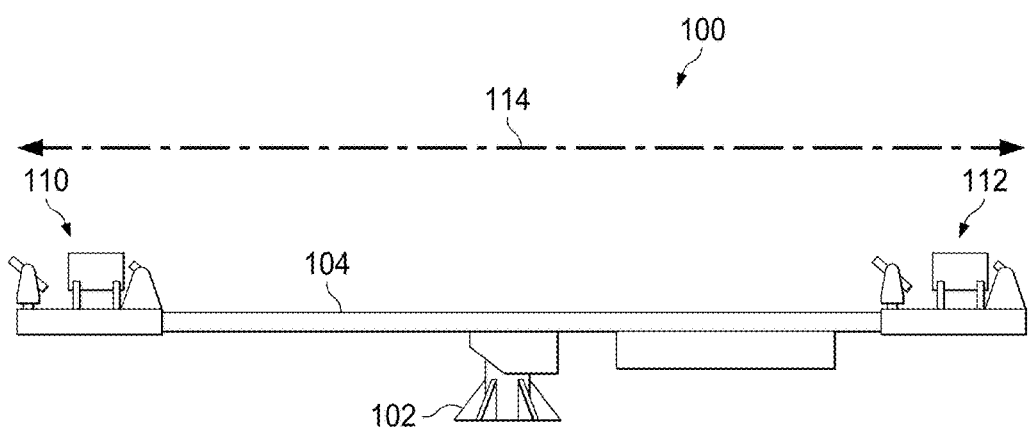
FIG. 2 illustrates another view of the interferometric telescope of FIG. 1, in accordance with an illustrative embodiment.

FIG. 2 illustrates another view of the interferometric telescope of FIG. 1, in accordance with an illustrative embodiment. Because FIG. 2 is another view of the interferometric telescope of FIG. 1, FIG. 2 and FIG. 1 share common reference numerals.

The dimensions for the example covered in this disclosure are given in FIG. 2, below. The distance from one light collector to the other light collector defines the baseline of the interferometer. In one illustrative embodiment, this distance may be 16 meters, but may be more or less depending on the implementation and optical resolution desired.

Figure 3A:
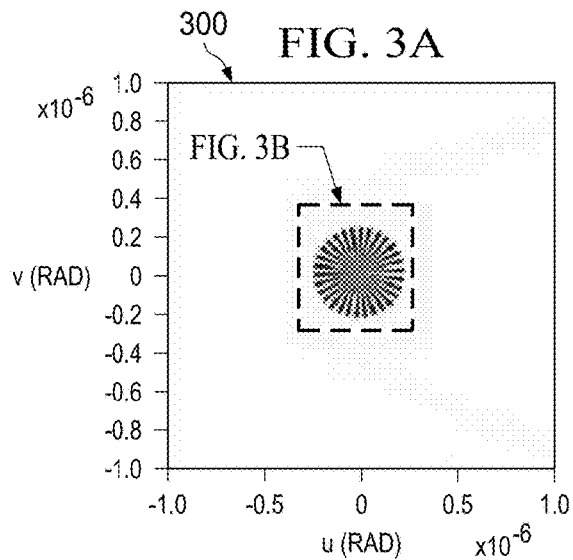
FIG. 3A illustrates a reference image of an object as it actually appears, in accordance with an illustrative embodiment.

FIG. 3A illustrates a reference image of an object as it actually appears, in accordance with an illustrative embodiment. Image 300 is a reference image of an object. In some illustrative examples, image 300 may be referred to as an ideal image of a reference object. In some illustrative examples, image 300 may be referred to as a pristine image.

An ideal image is an image without diffraction or other inconsistencies introduced by an optical system. Diffraction in an image blurs the edges of the image.

Figure 3B:
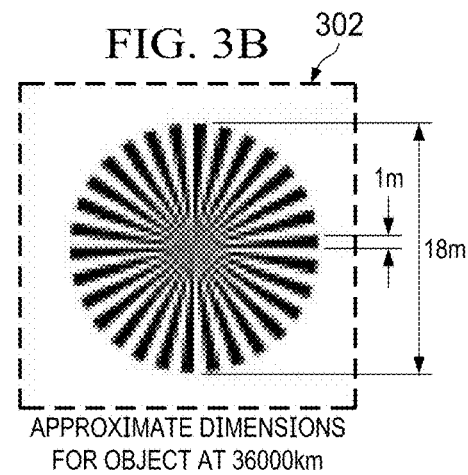
FIG. 3B illustrates a zoom-in view of the reference image of FIG. 3A, in accordance with an illustrative embodiment.

FIG. 3B illustrates a zoom-in view of the reference image of FIG. 3A, in accordance with an illustrative embodiment. Thus, image 302 is a magnified representation of image 300.

To help understand the benefits of increasing the baseline (the distance between optical assemblies) of mounting beam 104 shown in FIG. 1 and FIG. 2, FIG. 3A shows an ideal image of a reference object. The angular extent of the reference object is 500 nRad in this example. In a geostationary orbit of 36,000 km above a ground-based telescope, the reference object would represent an 18 meter diameter object, and the outer features on the object are on the order of 1 meter as shown in FIG. 3B.

Figure 4:
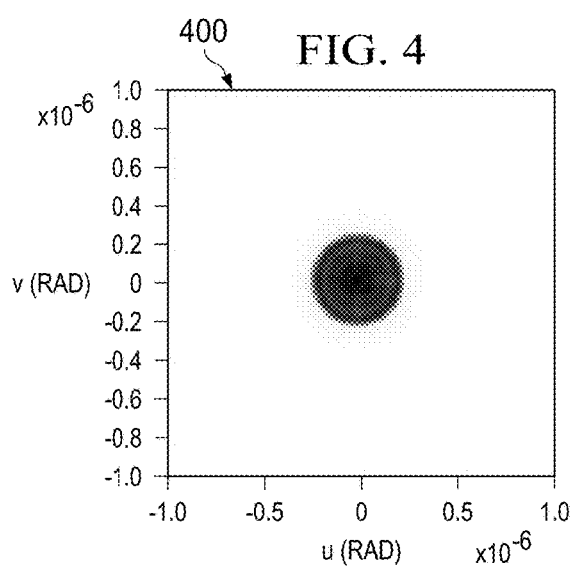
FIG. 4 illustrates an image of the object in FIGS. 3A and 3B as seen through an interferometric telescope shown in FIG. 1 and FIG. 2, in accordance with an illustrative embodiment.

FIG. 4 illustrates an image of the object in FIGS. 3A and 3B as seen through an interferometric telescope shown in FIG. 1 and FIG. 2, in accordance with an illustrative embodiment. Image 400 is obtained from a 16 meter baseline traditional interferometric telescope, accounting only for diffraction. Clearly, little or no detail is discernible from the relatively large, traditional interferometric telescope. Image 400 is important because it represents the best possible image from a rotating interferometric telescope with a 16 meter baseline.

One way to get more resolution from the reference image is to use a bigger baseline. Using the approach from SPIRIT, this could be achieved by increasing the length of the truss and moving one of the optical assemblies relative to the other one to fill in all the other baselines thus densifying the u-v plane. This same effect could also be achieved by adding multiple optical assemblies onto a longer truss and using different pairs to fill in the other baselines. The difficulty with both of these approaches, for a ground-based telescope, is that at some length it is no longer practical to support the truss only from a center pivot point. This fact is because, unlike in space, gravity sag and balance make a very long truss a difficult design problem. Perhaps more importantly, a very long truss becomes difficult to be dynamically stabilized with many seismic and wind disturbance paths and a high modal density in the frequency range of these disturbances. Thus, this disclosure describes an alternative to a very long truss that achieves the same advantage in resolution at a fraction of the cost and complexity.

Figure 5:
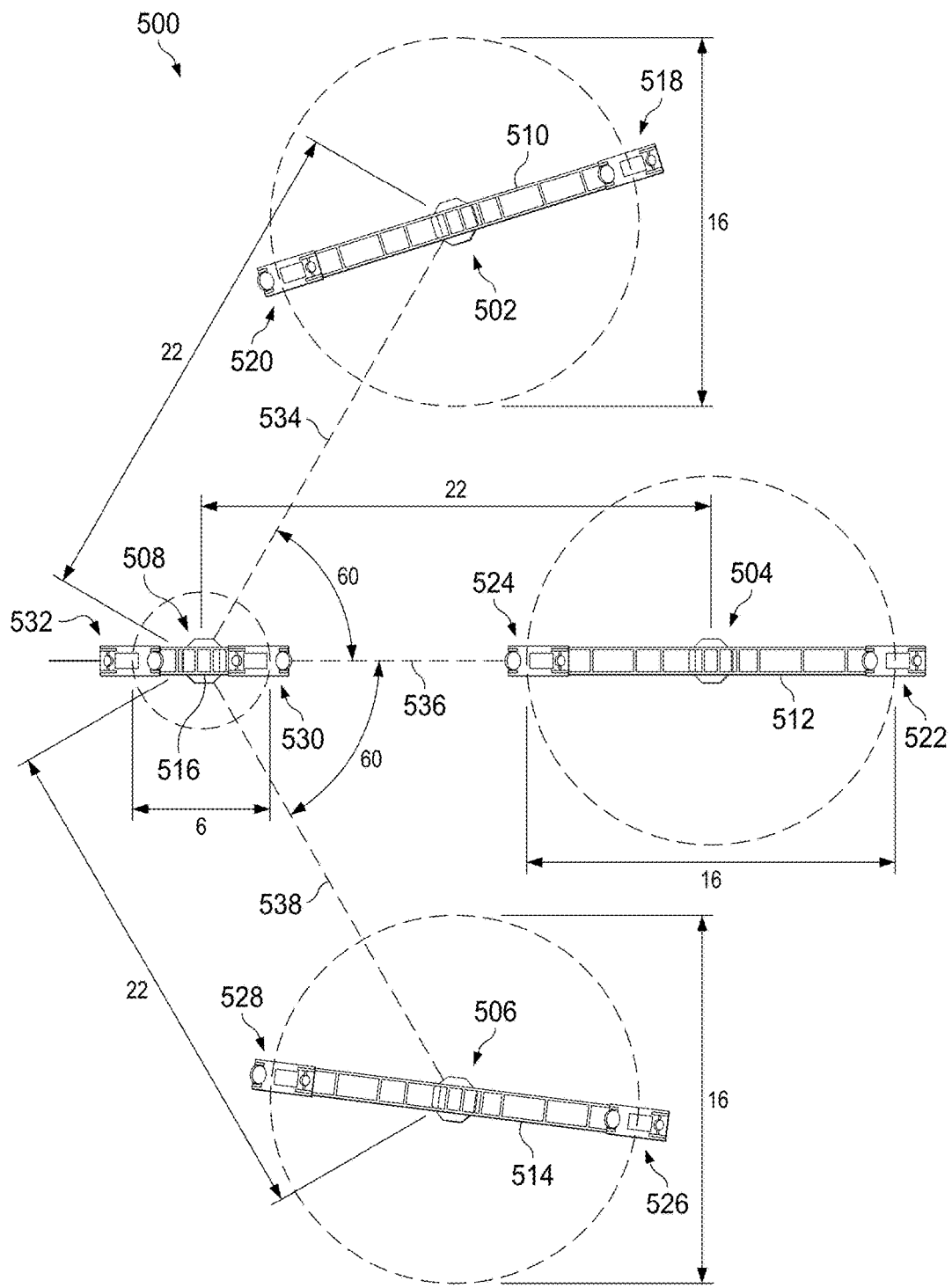
FIG. 5 illustrates a modular interferometric telescope, in accordance with an illustrative embodiment.

FIG. 5 illustrates a modular interferometric telescope, in accordance with an illustrative embodiment. Modular interferometric telescope 500 includes four main assemblies: optical assembly A 502, optical assembly B 504, optical assembly C 506, and optical assembly D 508. More or fewer such assemblies may be present, though there are a minimum of two assemblies for the modular interferometric telescope. The circles shown associated with each assembly show how each assembly rotates in a horizontal plane relative to the view shown in FIG. 5 (i.e., the plane of the page).

Each assembly includes a corresponding mounting beam, such as mounting beam 510, mounting beam 512, mounting beam 514, and mounting beam 516. Again, more or fewer mounting beams may be present, and each may be varied as described above with respect to FIG. 1 and FIG. 2. Each mounting beam is connected to a base (not shown in this view), as shown with respect to FIG. 1 and FIG. 2.

Each mounting beam also includes at least one light-collecting assembly. Thus, mounting beam 510 supports light-collecting assembly 518 plus optional additional light-collecting assemblies, such as light-collecting assembly 520. Mounting beam 512 supports light-collecting assembly 522 plus optional additional light-collecting assemblies, such as light-collecting assembly 524. Mounting beam 514 supports light-collecting assembly 526 plus optional additional light-collecting assemblies, such as light-collecting assembly 528. Mounting beam 516 supports light-collecting assembly 530 plus optional additional light-collecting assemblies, such as light-collecting assembly 532. Each light-collecting assembly transmits light received from the object to the corresponding base of the corresponding assembly.

However, optical assembly D 508 also serves as a beam combiner assembly, or hub, for receiving light from the other assemblies. The hub may also be referred to as an optical detector. In these illustrative examples, optical assembly D 508 comprises the optical detector (not depicted) of modular interferometric telescope 500. Thus, for example, light connection 534 connects the base of optical assembly A 502 to the base of optical assembly D 508. Likewise, light connection 536 connects the base of optical assembly B 504 to the base of optical assembly D 508. Similarly, light connection 538 connects the base of optical assembly C 506 to the base of optical assembly D 508. Each of these light connections may take several forms. For example, each could be an opaque tube which conveys the light. Each light connection could also be an optical fiber which transmits the light. It is also possible to place a fiber inside an opaque tube. In an illustrative embodiment, the beam combiner assembly at which the light from each collector is transported and combined to provide interferometric measurements, could be located on the central assembly. In another embodiment, combination of light may be performed at a separate location. The beam combiner assembly may also be referred to as an "optical detector," such as optical detector 2104 of FIG. 21.

Dimensions for modular interferometric telescope 500 are shown in FIG. 5. These dimensions and angles are exemplary only, and may be varied for a particular implementation.

Modular interferometric telescope 500 achieves a long baseline and a dense u-v plane by combining the motions of multiple, small interferometric telescopes. This design avoids gravity sag of the mounting beam and improves balance and structural dynamics of each device. A relatively small telescope is much easier to build and make stable in the presence of disturbances. Further damping may be provided using two tuned mass dampers that suppress the first vibration mode of the truss. A mass damper may be a weight of a pre-selected mass to suppress a particular vibration mode. The same approach and a scaled version (if necessary) of this design can be implemented on the 16 meter telescope to suppress vibrations. The rotation mechanism can be repurposed from a commonly available jib crane. FIG. 5 shows an illustration of a baseline configuration of the modular interferometric telescope with a total of 8 light collectors and 8 steering mirrors.

In this case, optical assembly B 504 rotates through 180 degrees with the two light collectors on optical assembly B 504 interfering with a single light collector on optical assembly D 508. The baseline length for this collection is:

$$rB+rD+h$$

where rB is the radius of optical assembly B 504, rD is the radius of optical assembly D 508 and h is the distance between the centers of the assemblies. In this example, the total distance is 33 meters.

The maximum length baseline is h+(rB+rD). This length results when both optical assemblies are rotated to align along the same axis, and interfering light between light-collecting assemblies located at the ends of each truss are farthest from each other.

The minimum length baseline is h−(rB+rD). This length results when both optical assemblies are rotated to align along the same axis, and interfering light between light-collecting assemblies located at the ends of each truss are closest to each other.

Other baseline lengths and orientations result from other rotations of the arrays and by mixing light from other pairings of light-collecting assemblies. Thus, a wide range of baseline lengths and orientations are possible.

In one embodiment, the system (modular interferometric telescope 500) collects measurements as the optical assemblies are continuously rotated. In another embodiment, the system (modular interferometric telescope 500) is rotated incrementally to a discrete series of angles and measurements are collected at each of these discrete angles, while the system is temporarily fixed at an angle.

Figure 6:
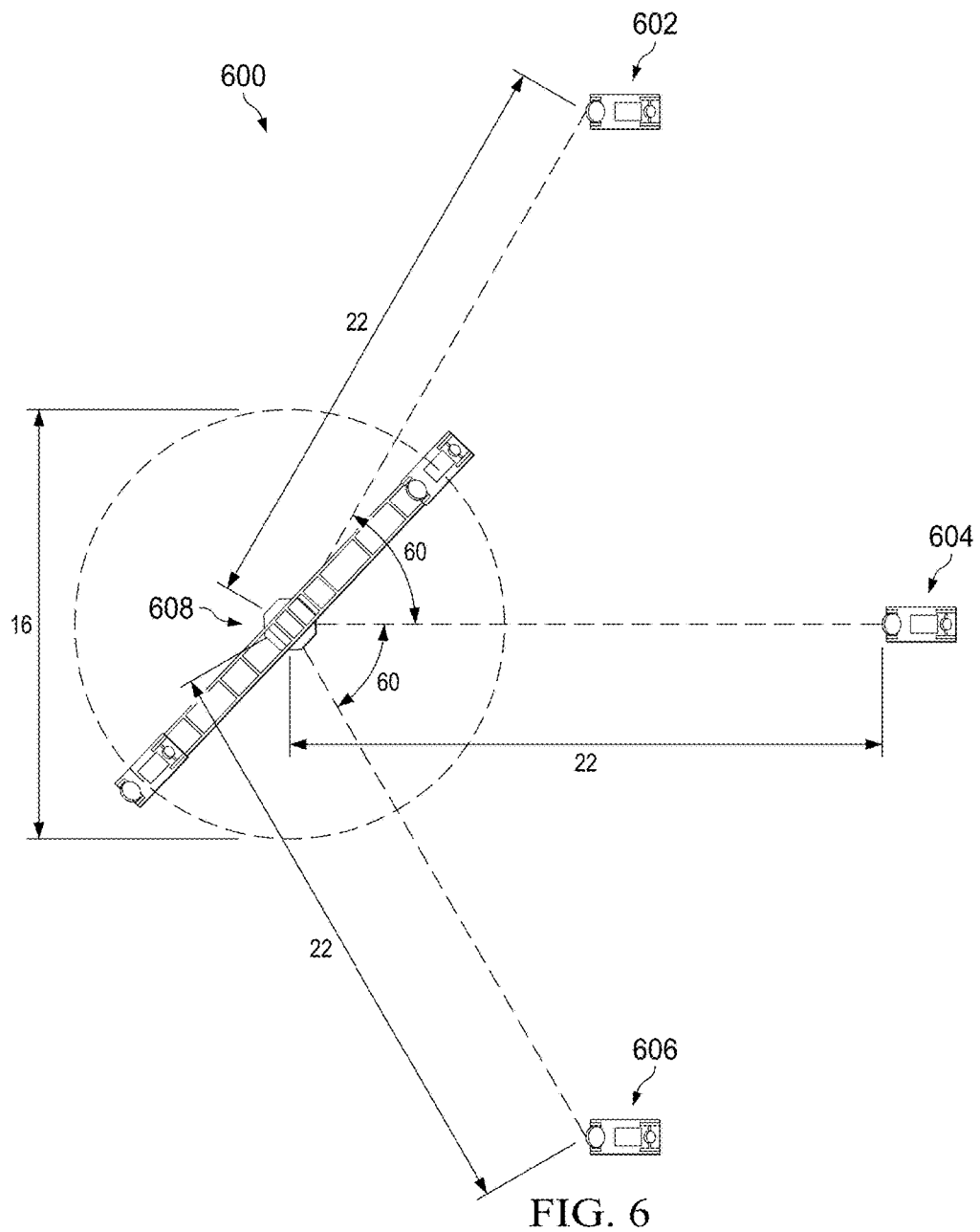
FIG. 6 illustrates another type of modular interferometric telescope, in accordance with an illustrative embodiment.

FIG. 6 illustrates another type of modular interferometric telescope, in accordance with an illustrative embodiment. Modular interferometric telescope 600 is a variation of modular interferometric telescope 500 of FIG. 5. In fact, the arrangement of modular interferometric telescope 600 is very similar and has similar components relative to modular interferometric telescope 500 of FIG. 5. However, in this case, optical assembly A 602, optical assembly B 604, and optical assembly C 606 are not mounted on rotating mounting beams. Instead, each of optical assembly A 602, optical assembly B 604, and optical assembly C 606 is a stand-alone optical assembly including at least one mirror and either a fiber or a light tube for sending light from a respective assembly to the optical detector in the base of optical assembly D 608. In some illustrative embodiments, each of the "distant" assemblies (optical assembly A 602, optical assembly B 604, and optical assembly C 606) may be individually translatable along a radial path relative to the base of optical assembly D 608.

Optical assembly D 608 serves as a beam combiner assembly, or hub, for receiving light from the other assemblies. The hub may also be referred to as an optical detector. In these illustrative examples, optical assembly D 608 comprises the optical detector (not depicted) of modular interferometric telescope 600.

Modular interferometric telescope 600 represents a less expensive and less complex version of modular interferometric telescope 500 of FIG. 5. However, if the distant assembles are fixed, modular interferometric telescope 600 gives up some of the ability to reconfigure the u-v fill using different relative rotations.

The minimum possible configuration of the modular interferometric telescope of the illustrative embodiments is to use the arrangement shown in FIG. 6, and to have only one distant assembly (say, for example, optical assembly B 604). However, the more distant assemblies are present and the more distant assemblies have mounting beams upon which to rotate, the clearer the ultimate image will be when observing a distant object.

In one embodiment, the system collects measurements as the assemblies are continuously rotated. In another embodiment, the system is rotated incrementally to a discrete series of angles and measurements are collected at each of these discrete angles, while the system is temporarily fixed at an angle.

Figure 7:
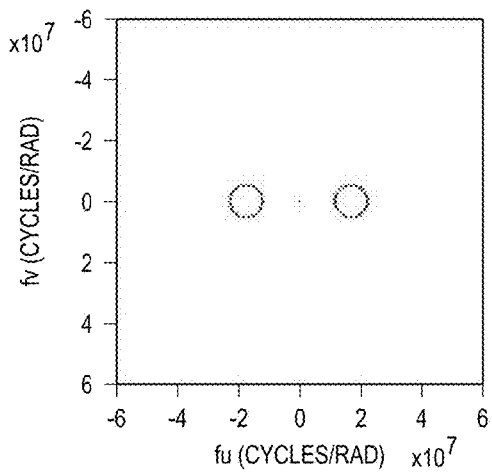
FIG. 7 illustrates a representation of a fill-in u-v plane for optical assembly B rotation of the modular interferometric telescope shown in FIG. 5 relative to a single light-collecting assembly on optical assembly D on the modular interferometric telescope shown in FIG. 5, at a 700 nm wavelength, in accordance with an illustrative embodiment.

FIG. 7 through FIG. 10 should be considered together. FIG. 7 illustrates a representation of a fill-in u-v plane for optical assembly B rotation of modular interferometric telescope 500 shown in FIG. 5 relative to a single light collector on optical assembly D of modular interferometric telescope 500 shown in FIG. 5, at a 700 nm wavelength, in accordance with an illustrative embodiment. As used herein, the acronym "nm" refers to "nanometer," which is a unit of length equal to one billionth of a meter. Using spectrometer techniques not described herein, the u-v fill increases significantly when the range of wavelengths is from 500 nm to 900 nm, as illustrated in FIG. 8. Thus, FIG. 8 illustrates a representation of a fill-in u-v plane for optical assembly B rotation of modular interferometric telescope 500 shown in FIG. 5 relative to a single telescope on optical assembly D on the interferometric telescope shown in FIG. 5, over a wavelength range from 500 nm to 900 nm, in accordance with an illustrative embodiment. Note that the two-dimensional spatial frequency coordinate in u-v plane is $$\vec{f} = (u, v) = \frac{B}{\lambda},$$

where f and B are both two-dimensional vectors and B is the vector separation of the apertures projected into the plane orthogonal to the line-of-sight from the array to the object.

The u-v fill in FIG. 9 results from a composition of the interferometric measurements between light collected by optical assembly A 502, optical assembly B 504, optical assembly C 506, and optical assembly D 508. Interference of light between optical collector assemblies, light-collecting assembly 522 on optical assembly B 504 and light-collecting assembly 530 on optical assembly D 508, provide the left and right u-v "petals" that lie on the horizontal axis (i.e. 3 and 9 o'clock positions) in FIG. 9. Interference of light between optical collector assemblies, light-collecting assembly 518 on optical assembly A 502 and light-collecting assembly 530 on optical assembly D 508 provide the u-v "petals" that lie about 1 and 7 o'clock. Interference of light between optical collector assemblies, light-collecting assembly 526 on optical assembly C 506 and light-collecting assembly 530 on optical assembly D 508, provide the u-v "petals" that lie about 5 and 11 o'clock. The u-v fill within each petal is achieved from interference between light from an optical collector on optical assembly D 508 and a collector on different rotating assembly, measured at a series of rotation angles spanning 360 degrees.

Figure 10:
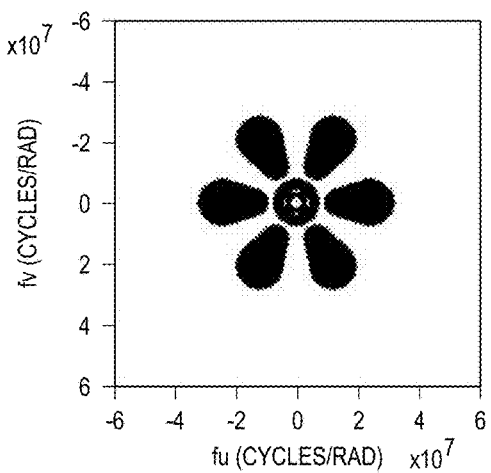
FIG. 10 illustrates a representation of a fill-in u-v plane for rotation of all optical assemblies of the modular interferometric telescope shown in FIG. 5, over a wavelength range from 500 nm to 900 nm, in accordance with an illustrative embodiment.

FIG. 10 illustrates a representation of a fill-in u-v plane for rotation of all assemblies of the interferometric telescope shown in FIG. 5, over a wavelength range from 500 nm to 900 nm, in accordance with an illustrative embodiment. In other words, the contribution of interfering two light-collecting assemblies on any of optical assembly A 502, optical assembly B 504, optical assembly C 506, and the contribution of interfering two light-collecting assemblies on optical assembly D 508 yields FIG. 10. The u-v fill in FIG. 10 results from an extension to the set of interferometric measurements for FIG. 9. A small central annulus of u-v fill is provided by interfering the light between light-collecting assembly 530 and light-collecting assembly 532 that lie at opposite ends of rotating optical assembly D 508. A second larger central annulus of u-v fill is provided by interfering the light between light-collecting assembly 518 and light-collecting assembly 520 that lie at opposite ends of rotating optical assembly A (or alternatively between light-collecting assembly 522 and light-collecting assembly 524 on optical assembly B 504, or between light-collecting assembly 526 and light-collecting assembly 528 on optical assembly C 506).

Figure 11A:
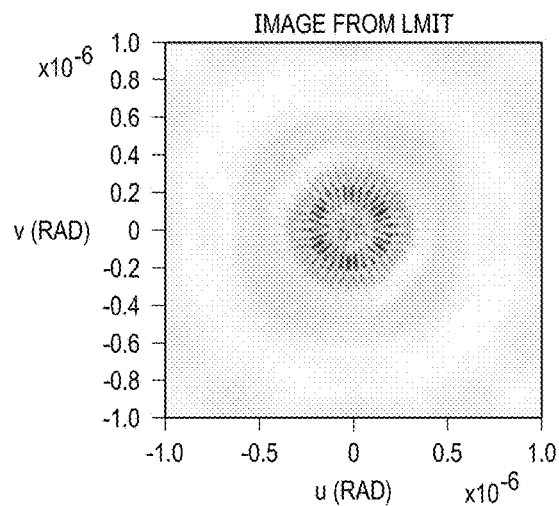
FIG. 11A illustrates an image taken by the modular interferometric telescope shown in FIG. 5, in accordance with an illustrative embodiment.
Figure 11B:
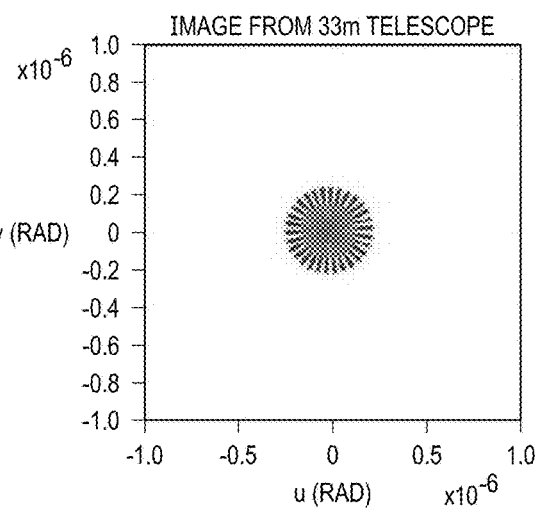
FIG. 11B illustrates an image taken by a 33 meter reflecting telescope, in accordance with an illustrative embodiment.

FIG. 11A illustrates an image taken by modular interferometric telescope 500 shown in FIG. 5, in accordance with an illustrative embodiment. FIG. 11B illustrates an image taken by a 33 meter reflecting telescope, in accordance with an illustrative embodiment. The image obtained from the modular interferometric telescope of the ideal image from FIG. 3 along with a diffraction limited image from a 33 meter diameter telescope are shown in FIG. 11A and FIG. 11B. The u-v plane for a filled, 33 meter diameter telescope would look like a filled circle with a diameter the same length as the longest dimension in the petal pattern of FIG. 10 (about 8×10$^7$ cycles/rad). A filled telescope is a conventional reflective telescope. As used herein the term "rad" refers to a radian, which is a unit of measurement of an angle.

FIG. 11A and FIG. 11B illustrate the similarity in discernible detail between the modular interferometric telescope in the example configuration of FIG. 5 and a 33 meter telescope. The modular interferometric telescope of the illustrative embodiments has the ability to tailor the u-v fill to focus on specific details of the object.

Figure 12:
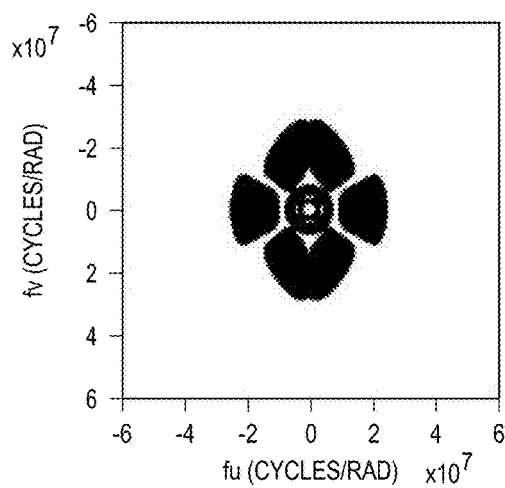
FIG. 12 illustrates a representation of a fill-in u-v plane with optical assemblies A and C in FIG. 5 changing from 60 to 70 degrees and the light-collecting assembly on optical assembly D counter-rotating as each of the optical assemblies A, B, and C rotate, in accordance with an illustrative embodiment.

FIG. 12 illustrates a representation of a fill-in u-v plane with optical assemblies A and C in FIG. 5 changing from 60 to 70 degrees and the telescope on optical assembly D counter-rotating as each of the optical assemblies A, B, and C rotate, in accordance with an illustrative embodiment. If the configuration of FIG. 5 is modified slightly with the angle of optical assembly A 502 and optical assembly C 506 changing from 60 to 70 degrees, and the telescope on optical assembly D 508 counter-rotates as each of the optical assembly A 502, optical assembly B 504, and optical assembly C 506 rotates, a u-v fill shown in FIG. 12 is obtained.

Figure 13A:
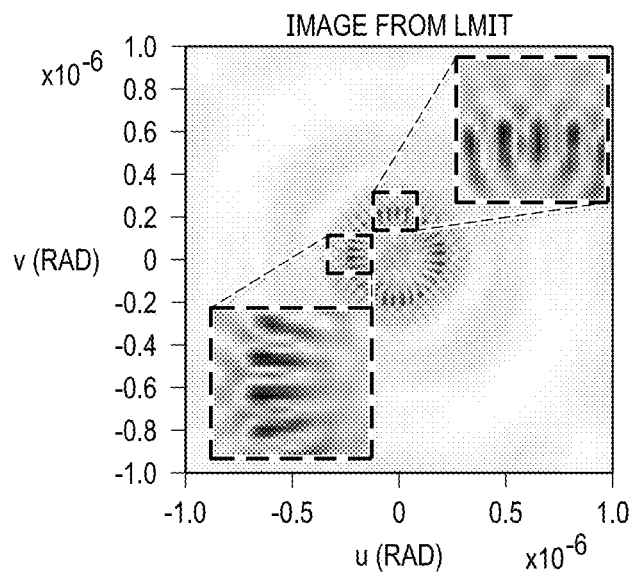
FIG. 13A illustrates an image taken by the modular interferometric telescope shown in FIG. 5, in accordance with an illustrative embodiment.
Figure 13B:
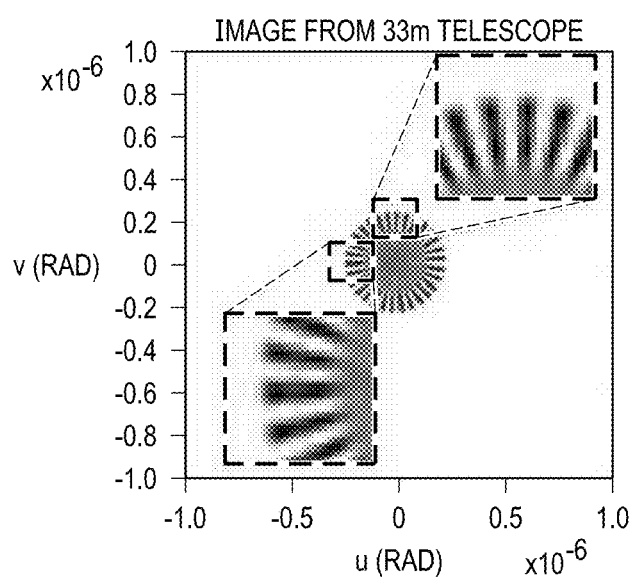
FIG. 13B illustrates an image taken by a 33 meter reflecting telescope, in accordance with an illustrative embodiment.

FIG. 13A illustrates an image taken by the modular interferometric telescope shown in FIG. 5, in accordance with an illustrative embodiment. FIG. 13B illustrates an image taken by a 33 meter reflecting telescope, in accordance with an illustrative embodiment.

Thus, FIG. 13A and FIG. 13B show a comparison of the image obtained using the modular interferometric telescope of the illustrative embodiments to an ideal telescope image. In the more densified, u-v plane at the top and bottom of FIG. 12 results in better resolution on the sides of left-hand and right-hand sides of the object image. In FIG. 13A, resolution is better in one axis than another. If a telescope can be re-oriented arbitrarily, resolution can be enhanced along a given axis. Thus, FIG. 13A and FIG. 13B illustrate that by slightly changing the geometry and/or the kinematics of the modular interferometric telescope baseline, preferential resolution can be achieved along a given axis of an object.

In either of the illustrative configurations described in FIG. 5 and FIG. 6, beam tubes or optical fibers would be used to transport light between assemblies. In contrast to an interferometric telescope with a longer truss, the transmission beam tubes do not have to move when the assembly rotates and can be firmly anchored to the ground and mechanically isolated, if desired. Thus, the illustrative embodiments may be dampened to a greater extent than a larger interferometric telescope.

Another advantage to the modular interferometric telescope is the ease of reconfiguration with the relatively inexpensive modifications of the beam tubes. A longer baseline can be achieved simply by extending the length of the beam tubes. More u-v fill can be achieved by adding more beam tubes and either adding more assemblies or by moving assemblies to different beam tube terminations during an observation of an object. If the object to be imaged has an intensity profile that is stable, it is conceivable that only one large and one small assembly could achieve the results shown in FIG. 11, FIG. 13A, and FIG. 13B, with the large assembly being moved to each of the three positions sequentially during an observation. This situation is common for many astronomical objects, and also occurs for ground observation of three-axis stabilized satellites in geosynchronous orbit over a period of several hours (beyond which changes in the solar illumination angle causes changes).

Thus, the illustrative embodiments shown with respect to FIG. 5 and FIG. 6 have several advantages. The interferometer is easy to be made bigger, because jib cranes are easy to move and nonrotating optical tube should be easy to extend. Additionally, the nonrotating transmission tube should be very stable. Furthermore, the structure can be made statically determinant and should be easily repeatable.

Another advantage is that the length of optical structure is minimized, thereby saving cost and weight. Still another advantage is that the design inherently provides minimal seismic disturbance inputs.

Yet another advantage is that the illustrative embodiments can move larger assembly to many positions (farther out or different circumference positions). Additionally, the complex beam combiner can be off the mounting beam if de-rotating optics are added. Further yet, geometric reconfiguration can easily change u-v fill, thereby tailoring the system to different applications.

Figure 14:
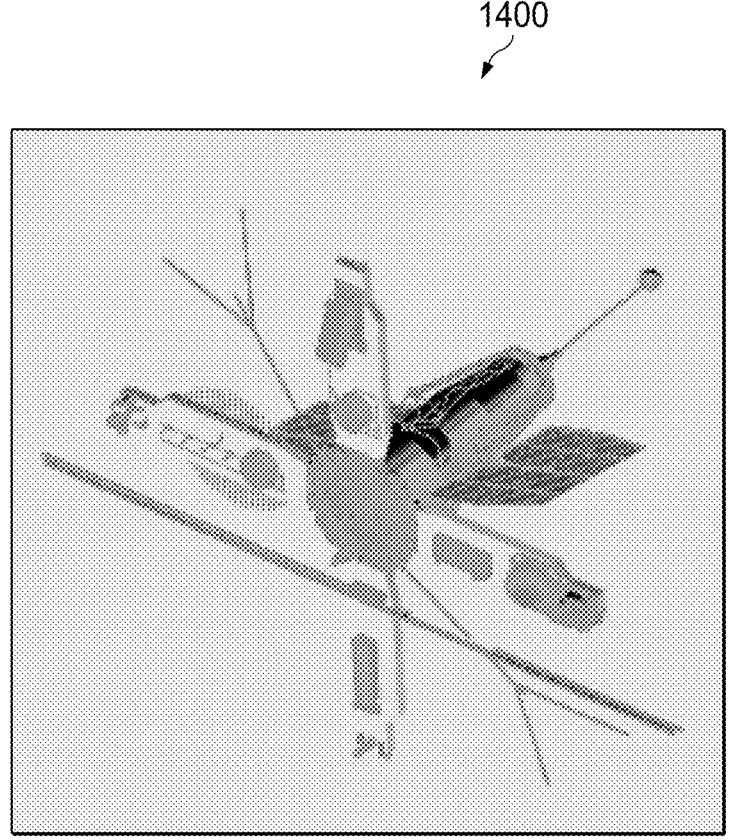
FIG. 14 is an illustration of an ideal image of a satellite, in accordance with an illustrative embodiment.

FIG. 14 is an illustration of an ideal image of a satellite, in accordance with an illustrative embodiment. Image 1400 in this example is of a satellite. The field of view is 550×550 nrad. Image 1400 for purposes of the following examples is the best possible image that could be obtained with a large (33 meter or larger) refracting or reflecting telescope.

FIG. 15 is an illustration of an alternative minimum configuration of a modular interferometric telescope, in accordance with an illustrative embodiment. Modular interferometric telescope 1500 is a variation of modular interferometric telescope 500 of FIG. 5 and modular interferometric telescope 600 of FIG. 6. Again, fixed collector 1502 and fixed collector 1504 are used in addition to a rotatable central assembly 1506. However, in this arrangement, a beam combiner 1508 optical system is added to collect light from all three assemblies. Optionally, intermediate collection aperture 1510 may be added for supporting phase control of light collected from one or more of the collectors, such as fixed collector 1502.

In one embodiment, the system collects measurements as the assemblies are continuously rotated. In another embodiment, the system is rotated incrementally to a discrete series of angles, and measurements are collected at each of these discrete angles, while the system is temporarily fixed at an angle.

Figure 16A:
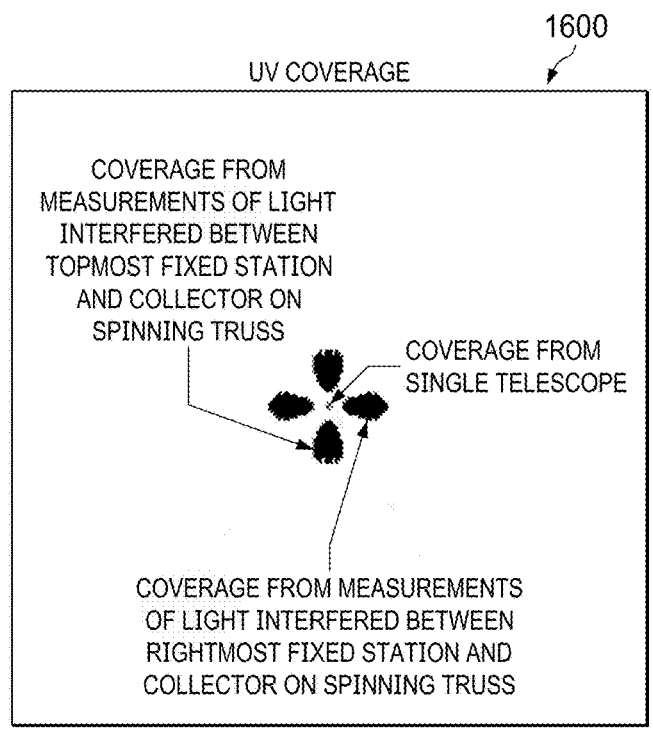
FIG. 16A illustrates u-v coverage of the minimum configuration shown in FIG. 15, in accordance with an illustrative embodiment.
Figure 16B:
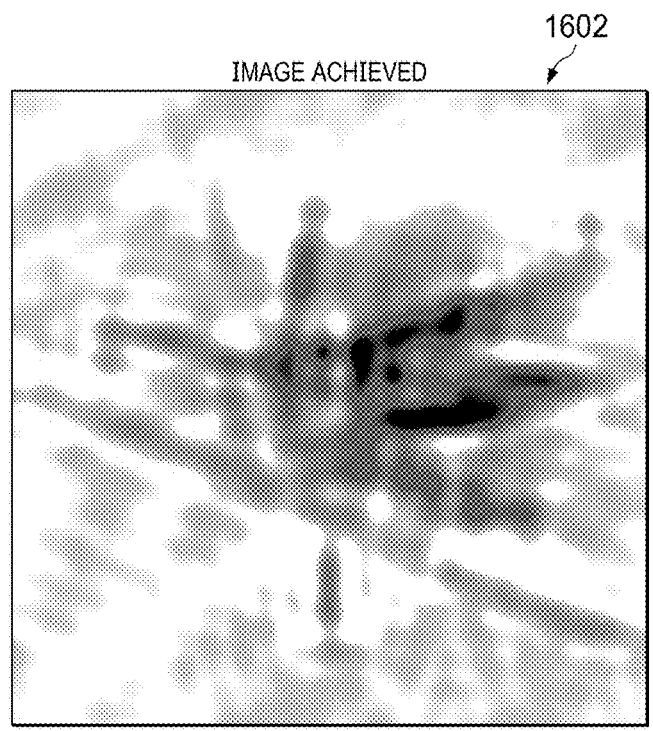
FIG. 16B illustrates an image acquired using the minimum configuration of the modular interferometric telescope shown in FIG. 15, in accordance with an illustrative embodiment.

FIG. 16A illustrates u-v coverage of the minimum configuration shown in FIG. 15, in accordance with an illustrative embodiment. As can be seen, u-v fill plane 1600 represents the mathematical results of using a single telescope and a ring of fixed stations interfered by using a spinning mounting beam (a truss in this case). FIG. 16B illustrates an image acquired using the minimum configuration of the modular interferometric telescope shown in FIG. 15, in accordance with an illustrative embodiment. As can be seen, image 1602 has some of the features of image 1400, though the image has a sub-optimal resolution.

FIG. 17 illustrates a medium configuration of a modular interferometric telescope, in accordance with an illustrative embodiment. The term "medium" is used because more distant optical assemblies are present in modular interferometric telescope 1700 than were present in modular interferometric telescope 1500 of FIG. 15. Thus, modular interferometric telescope 1700 is also a variation of modular interferometric telescope 500 of FIG. 5 and modular interferometric telescope 600 of FIG. 6.

In comparison to modular interferometric telescope 1500, modular interferometric telescope 1700 includes a larger number of distant optical assemblies with locations that are at a larger distance from the central assembly 1702. Thus, for example, in addition to central assembly 1702, five fixed collectors are provided, including fixed collector 1704, fixed collector 1706, fixed collector 1708, fixed collector 1710, and fixed collector 1712. One or more of these fixed collectors may be replaced with rotating optical assemblies on mounting beams, similar to central assembly 1702.

Optionally, collection apertures, such as collection aperture 1714 may be provided for supporting phase control. Beam combiner 1716 may be used to combine the light collected by all distant optical assemblies represented by the fixed collectors. Beam combiner 1716 is a physical implementation of an optical detector, such as optical detector 2104 of FIG. 21.

Light transport pipes, such as light transport pipe 1718 may be used to channel the collected light. Optical fibers may be used in addition to or instead of the light transport tubes. Dimensions of modular interferometric telescope 1700 are shown in FIG. 17.

In one embodiment, the system collects measurements as the assemblies are continuously rotated. In another embodiment, the system is rotated incrementally to a discrete series of angles and measurements are collected at each of these discrete angles, while the system is temporarily fixed at an angle.

Figure 18A:
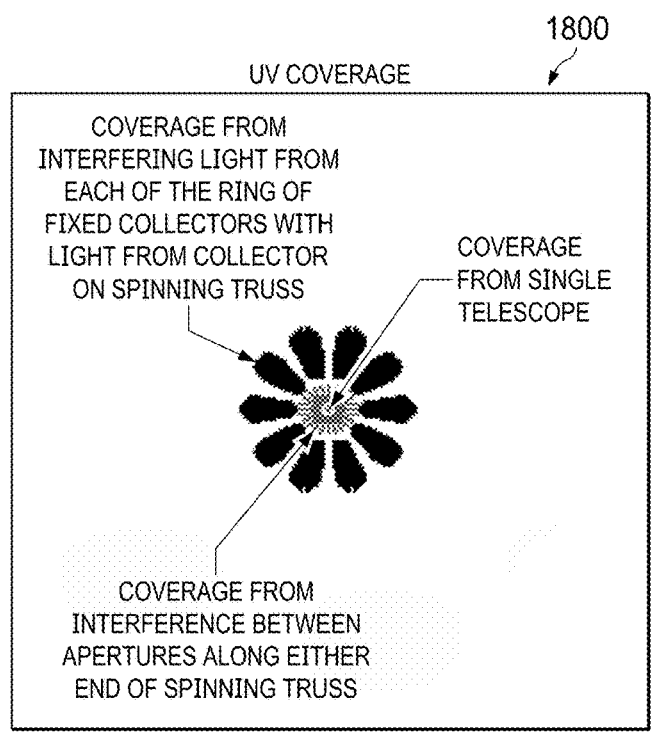
FIG. 18A illustrates u-v coverage of the medium configuration shown in FIG. 17, in accordance with an illustrative embodiment.
Figure 18B:
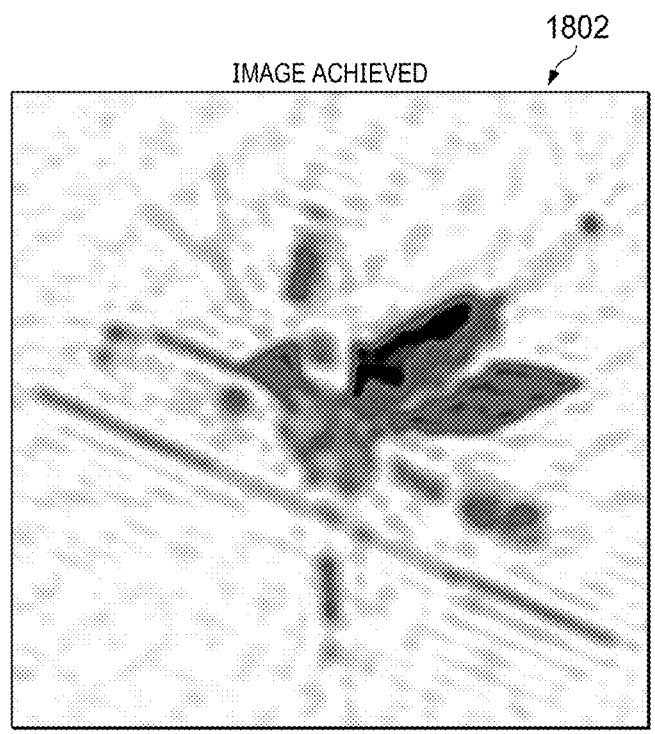
FIG. 18B illustrates an image acquired using the medium configuration of the modular interferometric telescope shown in FIG. 17, in accordance with an illustrative embodiment.

FIG. 18A illustrates u-v coverage of the medium configuration shown in FIG. 17, in accordance with an illustrative embodiment. FIG. 18B illustrates an image acquired using the medium configuration of the modular interferometric telescope shown in FIG. 17, in accordance with an illustrative embodiment. Note that image 1800 shows a u-v fill that is superior (greater than) to image 1602 of FIG. 16. This result occurs because of the increased number of distant collectors (optical assemblies or fixed collectors) and increased distance of them from the central assembly relative to the arrangement shown in FIG. 15. As a result, an improved image of the object is obtained, as shown by image 1802.

FIG. 19 illustrates a large configuration of a modular interferometric telescope, in accordance with an illustrative embodiment. The term "large" is used to describe the fact that a larger number of distant optical assemblies or collectors are present relative to modular interferometric telescope 1700 of FIG. 17, and they are located at larger distances from the central assembly. Thus, modular interferometric telescope 1900 is a variation of any of the prior modular interferometric telescopes shown elsewhere herein.

Again, central assembly 1902 is rotatable and may also have translatable light collectors (light-collecting assemblies). Again, a beam combiner 1904 may be present, as well as optional intermediate collection apertures for supporting phase control, such as intermediate aperture 1906. Beam combiner 1904 is a physical implementation of an optical detector, such as optical detector 2104 of FIG. 21.

Again, light transport pipes or optical fibers, such as light transport pipe 1908, may be used to communicate light from the fixed collector locations to beam combiner 1904.

However, in this arrangement, many more distant optical assemblies are present. In this example, modular interferometric telescope 1900 includes eight far distant optical assemblies or fixed collectors: fixed collector 1910, fixed collector 1912, fixed collector 1914, fixed collector 1916, fixed collector 1918, fixed collector 1920, fixed collector 1922, and fixed collector 1924. In addition, modular interferometric telescope 1900 includes four distant optical assemblies or fixed collectors: fixed collector 1926, fixed collector 1928, fixed collector 1930, and fixed collector 1932. The term "far distant" and "distant" are terms that indicate the relative distance with respect to beam combiner 1904, with "far distant" merely being farther away from beam combiner 1904 than "distant". In one non-limiting example "far distant" is 75 meters and "distant" is 40 meters, though these numbers may be varied for a particular implementation. The "far distant" fixed collectors may be referred-to as a first group of collectors and the "distant" fixed collectors may be referred-to as a second group of collectors. Some or all of the fixed collectors in either group may be either fixed, as shown in FIG. 6, or one or more optical assemblies on mounting beams, as shown in FIG. 5.

In one embodiment, the system collects measurements as the assemblies are continuously rotated. In another embodiment, the system is rotated incrementally to a discrete series of angles and measurements are collected at each of these discrete angles, while the system is temporarily fixed at an angle.

Figure 20A:
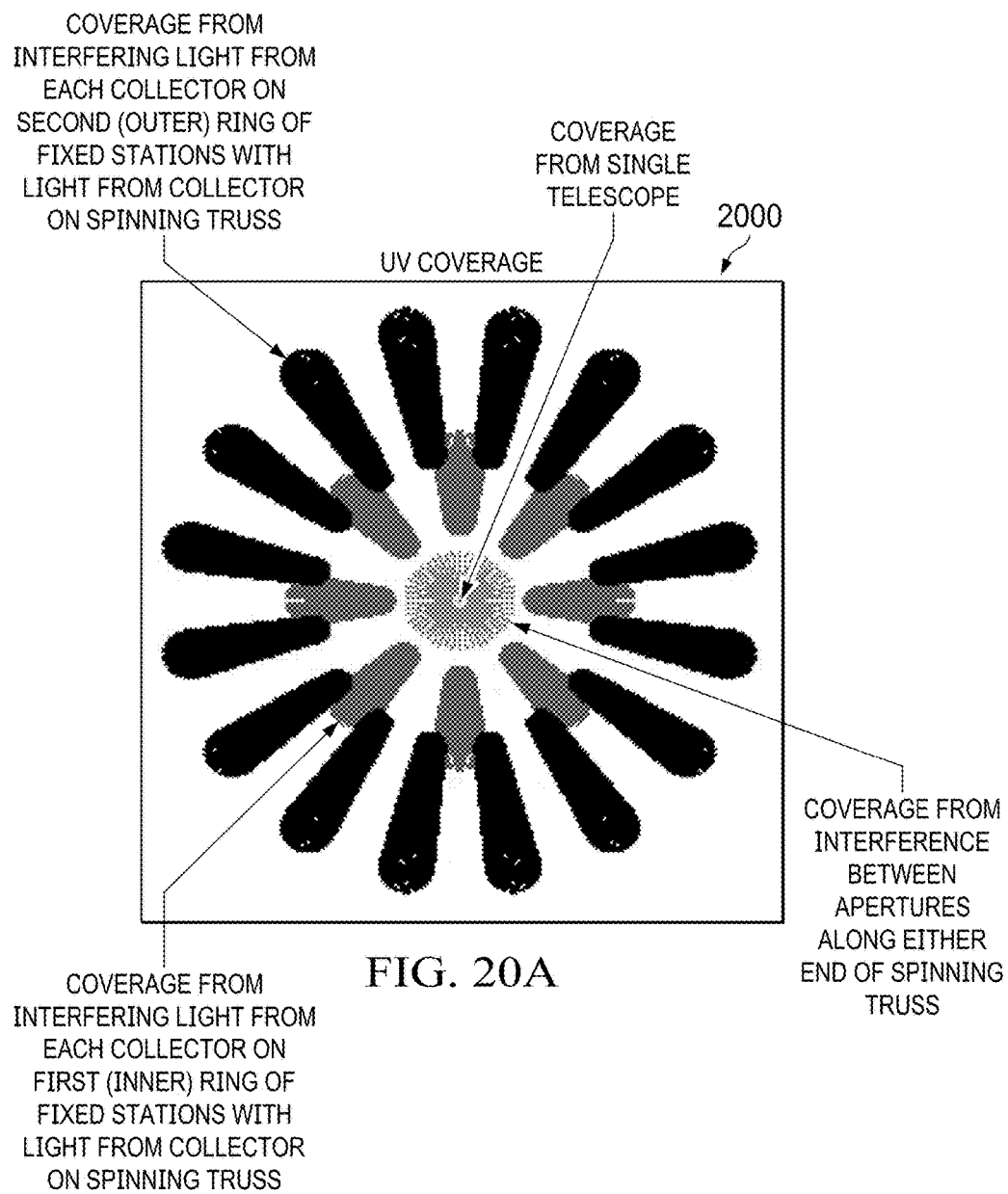
FIG. 20A illustrates u-v coverage of the large configuration shown in FIG. 19, in accordance with an illustrative embodiment.
Figure 20B:
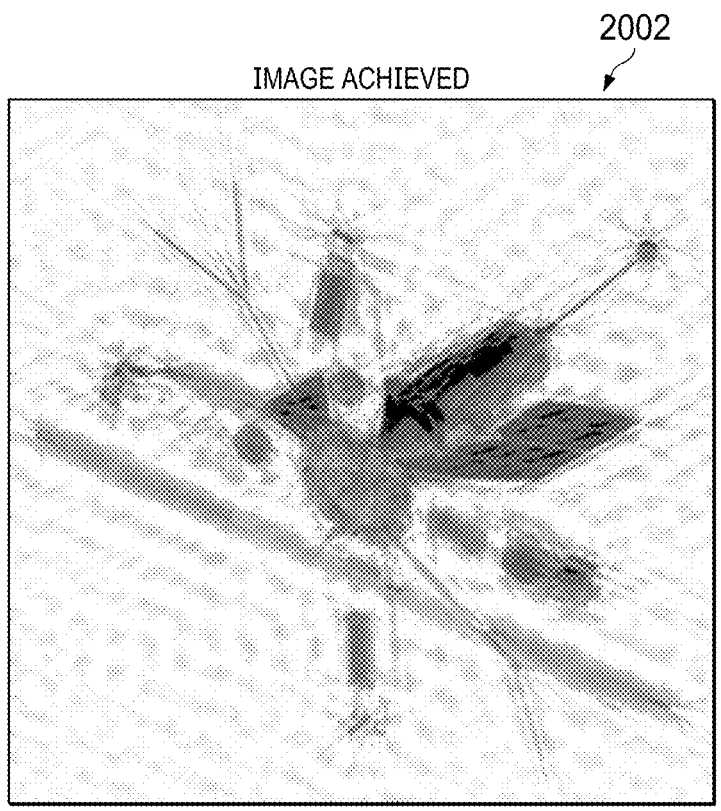
FIG. 20B illustrates an image acquired using the large configuration of the modular interferometric telescope shown in FIG. 19, in accordance with an illustrative embodiment.

FIG. 20A illustrates u-v coverage of the minimum configuration shown in FIG. 19, in accordance with an illustrative embodiment. FIG. 20B illustrates an image acquired using the minimum configuration of the modular interferometric telescope shown in FIG. 19, in accordance with an illustrative embodiment.

Note that image 2000 shows a u-v fill that is superior (greater extent than) to image 1602 of FIG. 16 or image 1800 of FIG. 18. This result occurs because more distant collectors (optical assemblies or fixed collectors) are present relative to the arrangement shown in FIG. 15 or FIG. 17, and are located at larger distances from the central assembly. As a result, an improved image of the object is obtained, as shown by image 2002.

Figure 21:
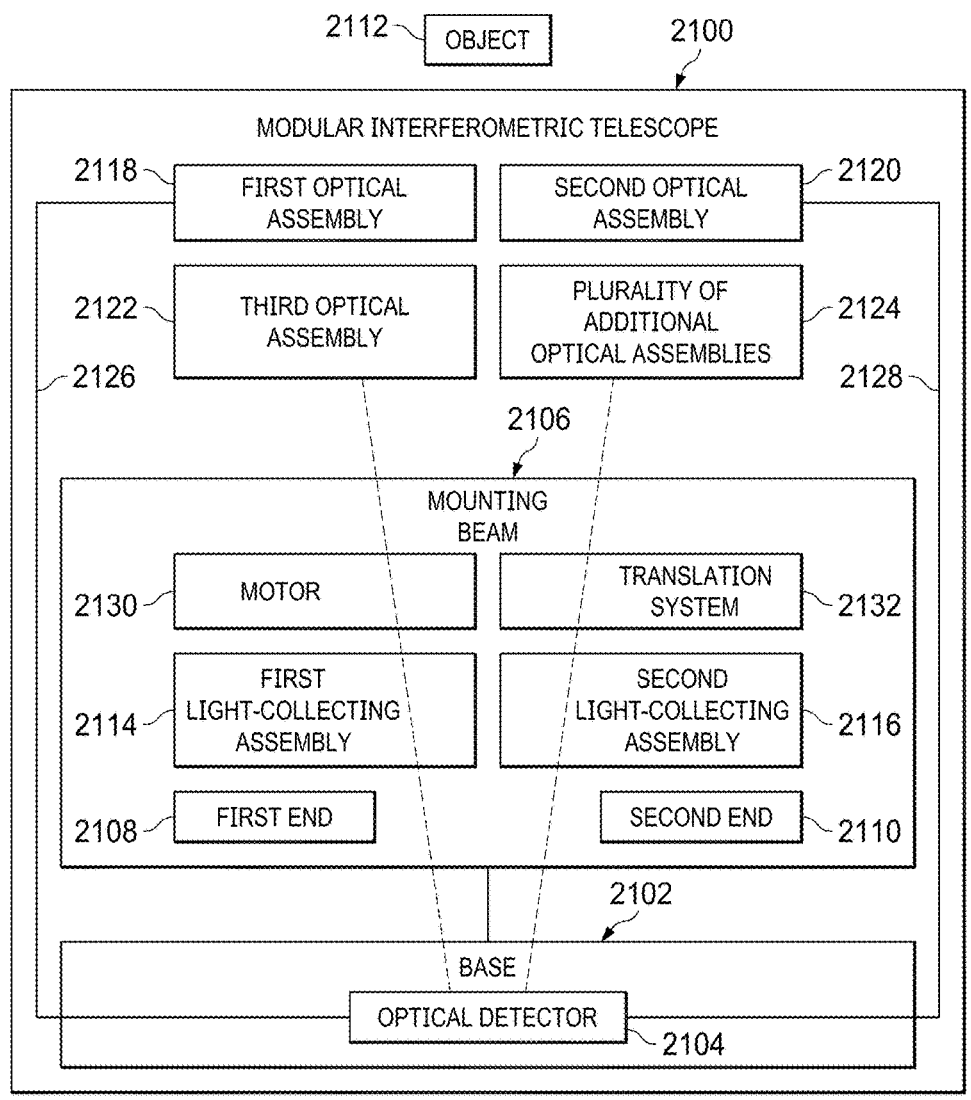
FIG. 21 illustrates a modular interferometric telescope, in accordance with an illustrative embodiment.

FIG. 21 illustrates a modular interferometric telescope, in accordance with an illustrative embodiment. Modular interferometric telescope 2100 is a variation of the other modular interferometric telescopes shown elsewhere herein, such as but not limited to modular interferometric telescope 500 of FIG. 5 or modular interferometric telescope 600 of FIG. 6, or any of the modular interferometric telescopes shown in FIG. 15, FIG. 17, or FIG. 19.

Modular interferometric telescope 2100 also includes a base 2102 and optical detector 2104 connected to base 2102. The optical detector 2104 could be present on the base 2102, or in another embodiment, the optical detector 2104 could be present at a separate independent location.

Modular interferometric telescope 2100 also includes mounting beam 2106 having a first end 2108, a second end 2110, and a length, and connected rotatably to the base 2102 at a point between the first end 2108 and the second end 2110. Mounting beam 2106 is rotatable about a first axis that extends in a direction of an object 2112 to be observed by the modular interferometric telescope 2100.

Modular interferometric telescope 2100 also includes first light-collecting assembly 2114 connected to the mounting beam 2106 proximal to the first end 2108 relative to the second end 2110. The first light-collecting assembly 2114 directs light from the object 2112 to the optical detector 2104. As used herein, a "light-collecting assembly" may be one or more of the following, possibly acting in concert, and possibly with multiple ones of a given type or different types of light-collecting assemblies: a mirror, a lens, an optical fiber, an optical tube, a diffraction grating, or any other suitable thing useable to collect or direct light in the manner described elsewhere herein.

Modular interferometric telescope 2100 also includes second light-collecting assembly 2116 connected to the mounting beam 2106 proximal to the second end 2110 relative to the first end 2108. The second light-collecting assembly 2116 directs the light from the object 2112 to the optical detector 2104.

Modular interferometric telescope 2100 also includes a first optical assembly 2118 configured to receive the light from the object 2112 and direct the light to the optical detector 2104. The first optical assembly 2118 is located a first distance away from the optical detector 2104 and from the mounting beam 2106. The first distance is greater than the length.

Modular interferometric telescope 2100 may be varied. For example, modular interferometric telescope 2100 may also include second optical assembly 2120 configured to receive the light from the object 2112 and direct the light to the optical detector 2104. The second optical assembly 2120 is located a second distance away from the optical detector 2014 and from the mounting beam 2106. The second distance is greater than the length. In some illustrative examples, the second optical assembly 2120 is located at a first acute angle to the first optical assembly 2118 relative to the base 2102.

In a related illustrative embodiment, the first distance equals the second distance. In another related illustrative embodiment, modular interferometric telescope 2100 may also include third optical assembly 2122 configured to receive the light from the object 2112 and direct the light to the optical detector 2104. The third optical assembly 2122 is located at a third distance away from the optical detector 2104 and from the mounting beam 2106. The third distance is greater than the length. In some illustrative examples, the third optical assembly 2122 is located at a second acute angle to the first optical assembly 2118 relative to the base 2102. The second acute angle being different than the first acute angle.

This illustrative embodiment may be yet further extended. For example, modular interferometric telescope 2100 may also include a plurality of additional optical assemblies 2124 configured to receive the light from the object 2112 and direct the light to the optical detector 2104. The plurality of additional optical assemblies 2124 is located at a plurality of corresponding additional distances away from the optical detector 2104 and from the mounting beam 2106. The plurality of corresponding additional distances each is greater than the length. The plurality of additional optical assemblies 2124 is located at a plurality of corresponding additional acute angles to the first optical assembly 2118 relative to the base 2102. Each of the plurality of corresponding additional acute angles is different than the first acute angle, the second acute angle, and all others of the plurality of corresponding additional acute angles.

In another illustrative embodiment, modular interferometric telescope 2100 may also include one or both of the following light tubes or optical fibers. For example, modular interferometric telescope 2100 may include a first opaque light tube, represented by line 2126, physically connecting the first optical assembly 2118 to the base 2102, through which the light is transmitted to the optical detector 2104; and a second opaque light tube, also represented by line 2128, physically connecting the second optical assembly 2120 to the base 2102, through which the light is transmitted to the optical detector 2104.

In the case of optical fibers, modular interferometric telescope 2100 may include a first optical fiber, also represented by line 2126, physically connecting the first optical assembly 2118 to the base 2102, through which the light is transmitted to the optical detector 2104; and a second optical fiber, also represented by line 2128, physically connecting the second optical assembly 2120 to the base 2102, through which the light is transmitted to the optical detector 2104.

In still another illustrative embodiment, at least one of the first light-collecting assembly 2114 and the second light-collecting assembly 2116 is moveable along a second axis disposed along the mounting beam 2106. In this case, a portion of the mounting beam 2106 can move along the length to change the length. Also, in this case, modular interferometric telescope 2100 may also include a motor 2130 and a translation system 2132 mounted to the mounting beam 2106 and to at least one of the first light-collecting assembly 2114 and the second light-collecting assembly 2116, the motor 2130 and the translation system 2132 configured to move the at least one of the first light-collecting assembly 2114 and the second light-collecting assembly 2116 along the length.

In an illustrative embodiment, the first optical assembly 2118 may include sub-components. For example, first optical assembly 2118 may include a second mounting beam having a third end, a fourth end, and a second length, and connected rotatably to a second base at a point between the third end and the fourth end, wherein the second mounting beam is rotatable about a third axis that extends in a direction of an object to be observed by the modular interferometric telescope. In this case, first optical assembly 2118 may also include a third light-collecting assembly connected to the second mounting beam proximal to the third end relative to the fourth end, wherein the third light-collecting assembly directs light from the object to a second optical detector located in the second base. Likewise, first optical assembly 2118 may also include a fourth light-collecting assembly connected to the second mounting beam proximal to the fourth end relative to the third end, wherein the fourth light-collecting assembly directs the light from the object to the second optical detector. First optical assembly 2118 may also include alight connection configured to transmit light from the second base to the optical detector in the base. Note that in other illustrative embodiments, the beam combiner need not be on or in the base, but may be remotely located from the base.

Still other variations are possible. Thus, the illustrative embodiments are not necessarily limited to the examples described with respect to FIG. 21.

In one embodiment, the system collects measurements as the assemblies are continuously rotated. In another embodiment, the system is rotated incrementally to a discrete series of angles and measurements are collected at each of these discrete angles, while the system is temporarily fixed at an angle.

Figure 22:
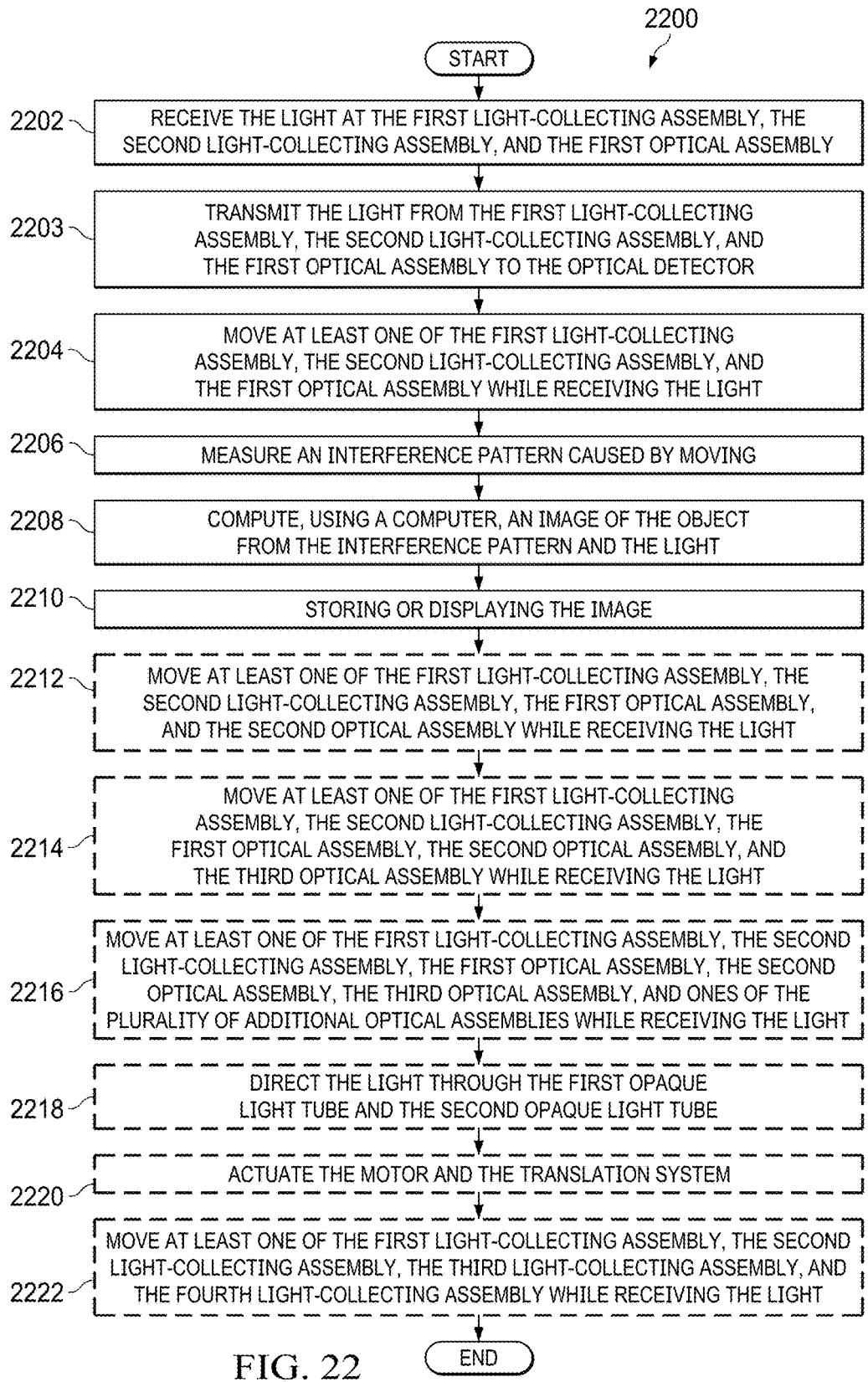
FIG. 22 illustrates a method of using a modular interferometric telescope, in accordance with an illustrative embodiment.

FIG. 22 illustrates a method of using a modular interferometric telescope, in accordance with an illustrative embodiment. Method may be implemented using modular interferometric telescope 2100 of FIG. 21 in conjunction with a computer, such as data processing system 2300 of FIG. 23. Operations shown inside boxes with dashed lines indicate optional operations.

Method 2200 may be characterized as a method of observing an object using a modular interferometric telescope that includes a base; an optical detector connected to the base; a mounting beam having a first end, a second end, and a length, and connected rotatably to the base at a point between the first end and the second end, wherein the mounting beam is rotatable about a first axis that extends in a direction of an object to be observed by the modular interferometric telescope; a first light-collecting assembly connected to the mounting beam proximal to the first end relative to the second end, wherein the first light-collecting assembly directs light from the object to the optical detector; a second light-collecting assembly connected to the mounting beam proximal to the second end relative to the first end, wherein the second light-collecting assembly directs the light from the object to the optical detector; and a first optical assembly configured to receive the light from the object and direct the light to the optical detector, wherein the first optical assembly is located at a first distance away from the optical detector and from the mounting beam, and wherein the first distance is greater than the length.

Method 2200 includes receiving the light at the first light-collecting assembly, the second light-collecting assembly, and the first optical assembly (operation 2202). Method 2200 also includes transmitting the light from the first light-collecting assembly, the second light-collecting assembly, and the first optical assembly to the optical detector (operation 2203).

Method 2200 also includes moving at least one of the first light-collecting assembly, the second light-collecting assembly, and the first optical assembly while receiving the light (operation 2204). Method 2200 also includes measuring an interference pattern caused by moving (operation 2206). Note that interference patterns may also be obtained by the location of two light-collecting assemblies whose light is being interfered, and the specific wavelength gives the u-v coordinates of the Fourier component of the object being measured via the interference pattern.

Method 2200 also includes computing, using a computer, an image of the object from the interference pattern and the light (operation 2208). Method 2200 also includes storing or displaying the image (operation 2210). Thus, the illustrative embodiments provide for using a computer to process the data from the interference measurements and possibly additional calibration measurements, computing an image of the object. In one illustrative embodiment, the method may terminate thereafter.

Method 2200 may be varied. For example, for any of the above illustrative embodiments, light may be collected while the assemblies are either moving or stationary. In another illustrative embodiment, the modular interferometric telescope further comprises a second optical assembly configured to receive the light from the object and direct the light to the optical detector, wherein the second optical assembly is located a second distance away from the optical detector and from the mounting beam, wherein the second distance is greater than the length, and wherein the second optical assembly is located at a first acute angle to the first optical assembly relative to the base. In this case, method 2200 may optionally include moving at least one of the first light-collecting assembly, the second light-collecting assembly, the first optical assembly, and the second optical assembly while receiving the light (operation 2212).

In an illustrative embodiment, the first distance equals the second distance. In another illustrative embodiment, the modular interferometric telescope further comprises a third optical assembly configured to receive the light from the object and direct the light to the optical detector, wherein the third optical assembly is located at a third distance away from the optical detector and from the mounting beam, wherein the third distance is greater than the length, and wherein the third optical assembly is located at a second acute angle to the first optical assembly relative to the base, the second acute angle being different than the first acute angle. In this case, method 2200 may include moving at least one of the first light-collecting assembly, the second light-collecting assembly, the first optical assembly, the second optical assembly, and the third optical assembly while receiving the light (operation 2214).

In another illustrative embodiment, the modular interferometric telescope further comprises a plurality of additional optical assemblies configured to receive the light from the object and direct the light to the optical detector, wherein the plurality of additional optical assemblies is located at a plurality of corresponding additional distances away from the optical detector and from the mounting beam, wherein the plurality of corresponding additional distances is greater than the length, and wherein the plurality of additional optical assemblies is located at a plurality of corresponding additional acute angles to the first optical assembly relative to the base, each of the plurality of corresponding additional acute angles being different than the first acute angle, the second acute angle, and all others of the plurality of corresponding additional acute angles. In this case, moving comprises: moving at least one of the first light-collecting assembly, the second light-collecting assembly, the first optical assembly, the second optical assembly, the third optical assembly, and ones of the plurality of additional optical assemblies while receiving the light (operation 2216).

In another illustrative embodiment, the modular interferometric telescope further comprises a first opaque light tube physically connecting the first optical assembly to the base, through which the light is transmitted to the optical detector; and a second opaque light tube physically connecting the second optical assembly to the base, through which the light is transmitted to the optical detector. In this case, method 2200 further includes directing the light through the first opaque light tube and the second opaque light tube (operation 2218).

In another illustrative embodiment, at least one of the first light-collecting assembly and the second light-collecting assembly is moveable along a second axis disposed along the mounting beam. In still another illustrative embodiment, a portion of the mounting beam can move along the length to change the length.

In yet another illustrative embodiment, the modular interferometric telescope further comprises a motor and a translation system mounted to the mounting beam and to at least one of the first light-collecting assembly and the second light-collecting assembly, the motor and the translation system configured to move the at least one of the first light-collecting assembly and the second light-collecting assembly along the length. In this case, method 2200 further includes actuating the motor and the translation system (operation 2220).

In still another illustrative embodiment, the first optical assembly comprises: a second mounting beam having a third end, a fourth end, and a second length, and connected rotatably to a second base at a point between the third end and the fourth end, wherein the second mounting beam is rotatable about a third axis that extends in a direction of an object to be observed by the modular interferometric telescope; a third light-collecting assembly connected to the second mounting beam proximal to the third end relative to the fourth end, wherein the third light-collecting assembly directs light from the object to a second optical detector located in the second base; a fourth light-collecting assembly connected to the second mounting beam proximal to the fourth end relative to the third end, wherein the fourth light-collecting assembly directs the light from the object to the second optical detector; and a light connection configured to transmit light from the second base to the optical detector in the base. In this case, method 2200 also includes moving at least one of the first light-collecting assembly, the second light-collecting assembly, the third light-collecting assembly, and the fourth light-collecting assembly while receiving the light (operation 2220).

In still another illustrative embodiment, interference measurements may be continuously collected while moving the assemblies, and also measurements may be made at a discrete set of angular orientations of assemblies and positions of the collectors while they are stationary, moving them to new positions between measurements. Still other variations are possible. Thus, the illustrative embodiments are not necessarily limited to the examples described with respect to FIG. 22.

Figure 23:
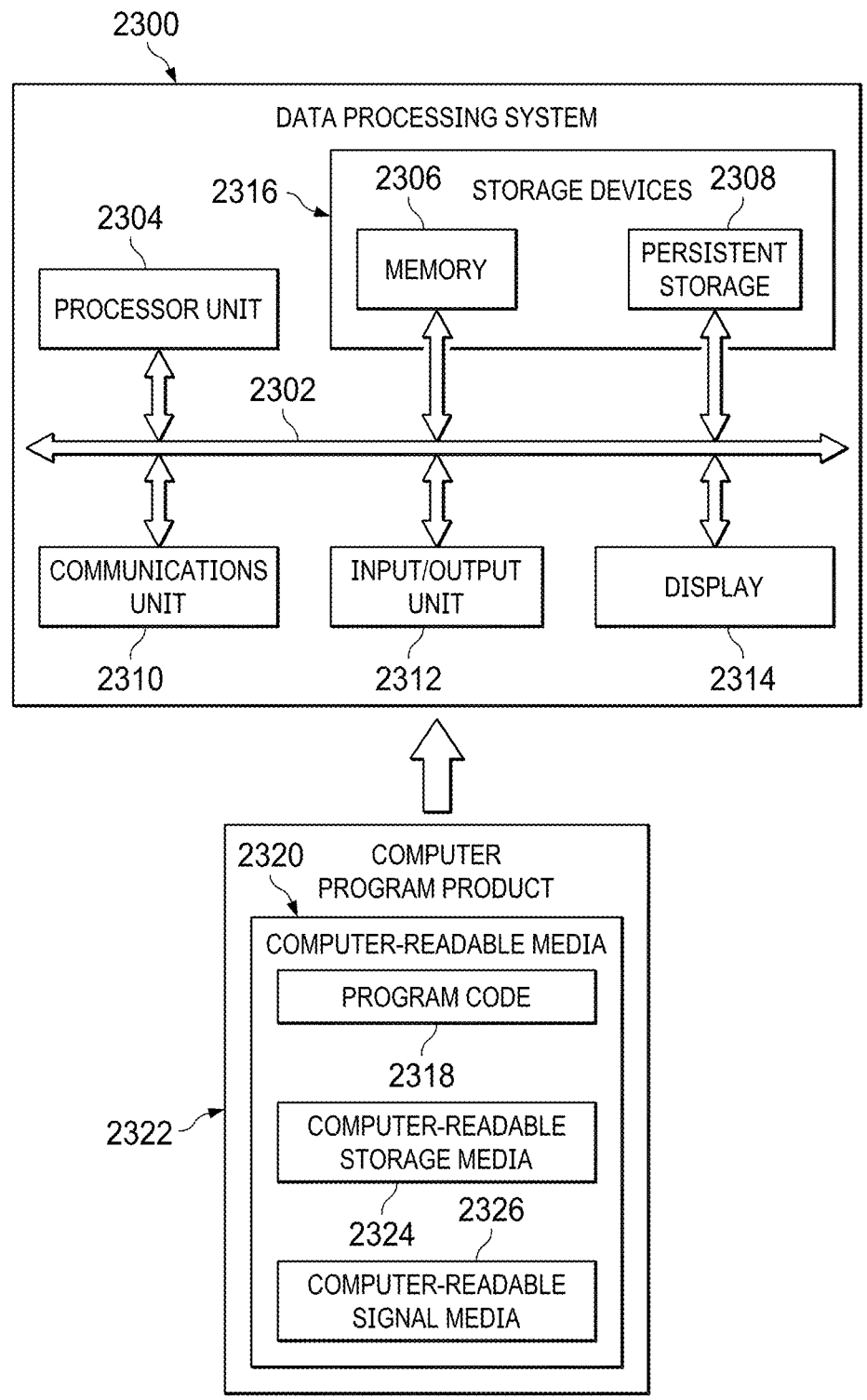
FIG. 23 illustrates a data processing system, in accordance with an illustrative embodiment.

Turning now to FIG. 23, an illustration of a data processing system is depicted in accordance with an illustrative embodiment. Data processing system 2300 in FIG. 23 is an example of a data processing system that may be used to implement the illustrative embodiments, such those described with respect to FIG. 2 through FIG. 14. In this illustrative example, data processing system 2300 includes communications fabric 2302, which provides communications between processor unit 2304, memory 2306, persistent storage 2308, communications unit 2310, input/output (I/O) unit 2312, and display 2314.

Processor unit 2304 serves to execute instructions for software that may be loaded into memory 2306. This software may be a content addressable memory, or software for implementing the processes described elsewhere herein. Thus, for example, software loaded into memory 2306 may be software for executing the methods described with respect to FIG. 2 through FIG. 22. Thus, for example, data processing system 2300 may serve as both a controller for the modular interferometric telescope shown in the figures above, and may also be used to perform the Fourier transformation calculations used to process data taken by the modular interferometric telescopes of the illustrative embodiments.

Processor unit 2304 may be a number of processors, a multi-processor core, or some other type of processor, depending on the particular implementation. A number, as used herein with reference to an item, means one or more items. Further, processor unit 2304 may be implemented using a number of heterogeneous processor systems in which a main processor is present with secondary processors on a single chip. As another illustrative example, processor unit 2304 may be a symmetric multi-processor system containing multiple processors of the same type.

Memory 2306 and persistent storage 2308 are examples of storage devices 2316. A storage device is any piece of hardware that is capable of storing information, such as, for example, without limitation, data, program code in functional form, and/or other suitable information either on a temporary basis and/or a permanent basis. Storage devices 2316 may also be referred to as computer readable storage devices in these examples. Memory 2306, in these examples, may be, for example, a random access memory or any other suitable volatile or non-volatile storage device. Persistent storage 2308 may take various forms, depending on the particular implementation.

For example, persistent storage 2308 may contain one or more components or devices. For example, persistent storage 2308 may be a hard drive, a flash memory, a rewritable optical disk, a rewritable magnetic tape, or some combination of the above. The media used by persistent storage 2308 also may be removable. For example, a removable hard drive may be used for persistent storage 2308.

Communications unit 2310, in these examples, provides for communications with other data processing systems or devices. In these examples, communications unit 2310 is a network interface card. Communications unit 2310 may provide communications through the use of either or both physical and wireless communications links.

Input/output (I/O) unit 2312 allows for input and output of data with other devices that may be connected to data processing system 2300. For example, input/output (I/O) unit 2312 may provide a connection for user input through a keyboard, a mouse, and/or some other suitable input device. Further, input/output (I/O) unit 2312 may send output to a printer. Display 2314 provides a mechanism to display information to a user.

Instructions for the operating system, applications, and/or programs may be located in storage devices 2316, which are in communication with processor unit 2304 through communications fabric 2302. In these illustrative examples, the instructions are in a functional form on persistent storage 2308. These instructions may be loaded into memory 2306 for execution by processor unit 2304. The processes of the different embodiments may be performed by processor unit 2304 using computer implemented instructions, which may be located in a memory, such as memory 2306.

These instructions are referred to as program code, computer usable program code, or computer readable program code that may be read and executed by a processor in processor unit 2304. The program code in the different embodiments may be embodied on different physical or computer readable storage media, such as memory 2306 or persistent storage 2308.

Program code 2318 is located in a functional form on computer readable media 2320 that is selectively removable and may be loaded onto or transferred to data processing system 2300 for execution by processor unit 2304. Program code 2318 and computer readable media 2320 form computer program product 2322 in these examples. In one example, computer readable media 2320 may be computer readable storage media 2324 or computer readable signal media 2326. Computer readable storage media 2324 may include, for example, an optical or magnetic disk that is inserted or placed into a drive or other device that is part of persistent storage 2308 for transfer onto a storage device, such as a hard drive, that is part of persistent storage 2308. Computer readable storage media 2324 also may take the form of a persistent storage, such as a hard drive, a thumb drive, or a flash memory, that is connected to data processing system 2300. In some instances, computer readable storage media 2324 may not be removable from data processing system 2300.

Alternatively, program code 2318 may be transferred to data processing system 2300 using computer readable signal media 2326. Computer readable signal media 2326 may be, for example, a propagated data signal containing program code 2318. For example, computer readable signal media 2326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2318 may be downloaded over a network to persistent storage 2308 from another device or data processing system through computer readable signal media 2326 for use within data processing system 2300. For instance, program code stored in a computer readable storage medium in a server data processing system may be downloaded over a network from the server to data processing system 2300. The data processing system providing program code 2318 may be a server computer, a client computer, or some other device capable of storing and transmitting program code 2318.

The different components illustrated for data processing system 2300 are not meant to provide architectural limitations to the manner in which different embodiments may be implemented. The different illustrative embodiments may be implemented in a data processing system including components in addition to or in place of those illustrated for data processing system 2300. Other components shown in FIG. 23 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2304 may take the form of a hardware unit that has circuits that are manufactured or configured for a particular use. This type of hardware may perform operations without needing program code to be loaded into a memory from a storage device to be configured to perform the operations.

For example, when processor unit 2304 takes the form of a hardware unit, processor unit 2304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 2318 may be omitted because the processes for the different embodiments are implemented in a hardware unit.

In still another illustrative example, processor unit 2304 may be implemented using a combination of processors found in computers and hardware units. Processor unit 2304 may have a number of hardware units and a number of processors that are configured to run program code 2318. With this depicted example, some of the processes may be implemented in the number of hardware units, while other processes may be implemented in the number of processors.

As another example, a storage device in data processing system 2300 is any hardware apparatus that may store data. Memory 2306, persistent storage 2308, and computer readable media 2320 are examples of storage devices in a tangible form.

In another example, a bus system may be used to implement communications fabric 2302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 2306, or a cache, such as found in an interface and memory controller beam combiner assembly that may be present in communications fabric 2302.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A modular interferometric telescope comprising:
   a base;
   an optical detector connected to the base;
   a mounting beam having a first end, a second end, and a length, and connected rotatably to the base at a point between the first end and the second end, wherein the mounting beam is rotatable about a first axis that extends in a direction of an object to be observed by the modular interferometric telescope;
   a first light-collecting assembly connected to the mounting beam proximal to the first end relative to the second end, wherein the first light-collecting assembly directs light from the object to the optical detector;
   a second light-collecting assembly connected to the mounting beam proximal to the second end relative to the first end, wherein the second light-collecting assembly directs the light from the object to the optical detector; and
   a first optical assembly configured to receive the light from the object and direct the light to the optical detector, wherein the first optical assembly is located at a first distance away from the optical detector and from the mounting beam, and wherein the first distance is greater than the length.

2. The modular interferometric telescope of claim 1 further comprising:
   a second optical assembly configured to receive the light from the object and direct the light to the optical detector, wherein the second optical assembly is located a second distance away from the optical detector and from the mounting beam, wherein the second distance is greater than the length, and wherein the second optical assembly is located at a first acute angle to the first optical assembly relative to the base.

3. The modular interferometric telescope of claim 2, wherein the first distance equals the second distance.

4. The modular interferometric telescope of claim 2 further comprising:
   a third optical assembly configured to receive the light from the object and direct the light to the optical detector, wherein the third optical assembly is located at a third distance away from the optical detector and from the mounting beam, wherein the third distance is greater than the length, and wherein the third optical assembly is located at a second acute angle to the first optical assembly relative to the base, the second acute angle being different than the first acute angle.

5. The modular interferometric telescope of claim 4 further comprising:
a plurality of additional optical assemblies configured to receive the light from the object and direct the light to the optical detector, wherein the plurality of additional optical assemblies is located at a plurality of corresponding additional distances away from the optical detector and from the mounting beam, wherein the plurality of corresponding additional distances is greater than the length, and wherein the plurality of additional optical assemblies is located at a plurality of corresponding additional acute angles to the first optical assembly relative to the base, each of the plurality of corresponding additional acute angles being different than the first acute angle, the second acute angle, and all others of the plurality of corresponding additional acute angles.

6. The modular interferometric telescope of claim 2 further comprising one of:
a first opaque light tube physically connecting the first optical assembly to the base, through which the light is transmitted to the optical detector; and a second opaque light tube physically connecting the second optical assembly to the base, through which the light is transmitted to the optical detector; or
a first optical fiber physically connecting the first optical assembly to the base, through which the light is transmitted to the optical detector; and a second optical fiber physically connecting the second optical assembly to the base, through which the light is transmitted to the optical detector.

7. The modular interferometric telescope of claim 1, wherein at least one of the first light-collecting assembly and the second light-collecting assembly is moveable along a second axis disposed along the mounting beam.

8. The modular interferometric telescope of claim 7, wherein a portion of the mounting beam can move along the length to change the length.

9. The modular interferometric telescope of claim 7 further comprising:
a motor and a translation system mounted to the mounting beam and to at least one of the first light-collecting assembly and the second light-collecting assembly, the motor and the translation system configured to move the at least one of the first light-collecting assembly and the second light-collecting assembly along the length.

10. The modular interferometric telescope of claim 1, wherein the first optical assembly comprises:
a second mounting beam having a third end, a fourth end, and a second length, and connected rotatably to a second base at a point between the third end and the fourth end, wherein the second mounting beam is rotatable about a third axis that extends in a direction of an object to be observed by the modular interferometric telescope;
a third light-collecting assembly connected to the second mounting beam proximal to the third end relative to the fourth end, wherein the third light-collecting assembly directs light from the object to a second optical detector located in the second base;
a fourth light-collecting assembly connected to the second mounting beam proximal to the fourth end relative to the third end, wherein the fourth light-collecting assembly directs the light from the object to the second optical detector; and
a light connection configured to transmit light from the second base to the optical detector in the base.

11. A method of observing an object using a modular interferometric telescope that includes a base; an optical detector connected to the base; a mounting beam having a first end, a second end, and a length, and connected rotatably to the base at a point between the first end and the second end, wherein the mounting beam is rotatable about a first axis that extends in a direction of an object to be observed by the modular interferometric telescope; a first light-collecting assembly connected to the mounting beam proximal to the first end relative to the second end, wherein the first light-collecting assembly directs light from the object to the optical detector; a second light-collecting assembly connected to the mounting beam proximal to the second end relative to the first end, wherein the second light-collecting assembly directs the light from the object to the optical detector; and a first optical assembly configured to receive the light from the object and direct the light to the optical detector, wherein the first optical assembly is located a first distance away from the optical detector and from the mounting beam, and wherein the first distance is greater than the length, and wherein the method comprises:
receiving the light at the first light-collecting assembly, the second light-collecting assembly, and the first optical assembly;
transmitting the light from the first light-collecting assembly, the second light-collecting assembly, and the first optical assembly to the optical detector;
moving at least one of the first light-collecting assembly, the second light-collecting assembly, and the first optical assembly while receiving the light;
measuring an interference pattern caused by moving;
computing, using a computer, an image of the object from the interference pattern and the light; and
storing or displaying the image.

12. The method of claim 11, wherein the modular interferometric telescope further comprises a second optical assembly configured to receive the light from the object and direct the light to the optical detector, wherein the second optical assembly is located a second distance away from the optical detector and from the mounting beam, wherein the second distance is greater than the length, and wherein the second optical assembly is located at a first acute angle to the first optical assembly relative to the base, and wherein moving comprises:
moving at least one of the first light-collecting assembly, the second light-collecting assembly, the first optical assembly, and the second optical assembly while receiving the light.

13. The method of claim 12, wherein the first distance equals the second distance.

14. The method of claim 12, wherein the modular interferometric telescope further comprises a third optical assembly configured to receive the light from the object and direct the light to the optical detector, wherein the third optical assembly is located at a third distance away from the optical detector and from the mounting beam, wherein the third distance is greater than the length, and wherein the third optical assembly is located at a second acute angle to the first optical assembly relative to the base, the second acute angle being different than the first acute angle, and wherein moving comprises:

moving at least one of the first light-collecting assembly, the second light-collecting assembly, the first optical assembly, the second optical assembly, and the third optical assembly while receiving the light.

15. The method of claim 14, wherein the modular interferometric telescope further comprises a plurality of additional optical assemblies configured to receive the light from the object and direct the light to the optical detector, wherein the plurality of additional optical assemblies is located at a plurality of corresponding additional distances away from the optical detector and from the mounting beam, wherein the plurality of corresponding additional distances is greater than the length, and wherein the plurality of additional optical assemblies is located at a plurality of corresponding additional acute angles to the first optical assembly relative to the base, each of the plurality of corresponding additional acute angles being different than the first acute angle, the second acute angle, and all others of the plurality of corresponding additional acute angles, and wherein moving comprises:

moving at least one of the first light-collecting assembly, the second light-collecting assembly, the first optical assembly, the second optical assembly, the third optical assembly, and ones of the plurality of additional optical assemblies while receiving the light.

16. The method of claim 12, wherein the modular interferometric telescope further comprises a first opaque light tube physically connecting the first optical assembly to the base, through which the light is transmitted to the optical detector; and a second opaque light tube physically connecting the second optical assembly to the base, through which the light is transmitted to the optical detector, and wherein the method further comprises:

directing the light through the first opaque light tube and the second opaque light tube.

17. The method of claim 11, wherein at least one of the first light-collecting assembly and the second light-collecting assembly is moveable along a second axis disposed along the mounting beam.

18. The method of claim 17, wherein a portion of the mounting beam can move along the length to change the length.

19. The method of claim 17, wherein the modular interferometric telescope further comprises a motor and a translation system mounted to the mounting beam and to at least one of the first light-collecting assembly and the second light-collecting assembly, the motor and the translation system configured to move the at least one of the first light-collecting assembly and the second light-collecting assembly along the length, and wherein moving comprises:

actuating the motor and the translation system.

20. The method of claim 11, wherein the first optical assembly comprises: a second mounting beam having a third end, a fourth end, and a second length, and connected rotatably to a second base at a point between the third end and the fourth end, wherein the second mounting beam is rotatable about a third axis that extends in a direction of an object to be observed by the modular interferometric telescope; a third light-collecting assembly connected to the second mounting beam proximal to the third end relative to the fourth end, wherein the third light-collecting assembly directs light from the object to a second optical detector located in the second base; a fourth light-collecting assembly connected to the second mounting beam proximal to the fourth end relative to the third end, wherein the fourth light-collecting assembly directs the light from the object to the second optical detector; and a light connection configured to transmit light from the second base to the optical detector in the base, and wherein moving comprises:

moving at least one of the first light-collecting assembly, the second light-collecting assembly, the third light-collecting assembly, and the fourth light-collecting assembly while receiving the light.

* * * * *